United States Patent
Lim et al.

(10) Patent No.: US 10,511,487 B2
(45) Date of Patent: Dec. 17, 2019

(54) METHOD AND MECHANISM FOR EFFICIENTLY MANAGING FLOWS

(71) Applicant: Nicira, Inc., Palo Alto, CA (US)

(72) Inventors: Harold Vinson C. Lim, Mountain View, CA (US); Natasha Gude, Palo Alto, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 16/364,158

(22) Filed: Mar. 25, 2019

(65) Prior Publication Data

US 2019/0222482 A1    Jul. 18, 2019

Related U.S. Application Data

(63) Continuation of application No. 15/064,581, filed on Mar. 8, 2016, now Pat. No. 10,250,449.

(51) Int. Cl.
| | |
|---|---|
| *H04L 12/26* | (2006.01) |
| *H04L 12/24* | (2006.01) |
| *H04L 12/741* | (2013.01) |
| *H04L 12/721* | (2013.01) |
| *H04L 12/54* | (2013.01) |
| *H04L 29/12* | (2006.01) |
| *H04L 12/28* | (2006.01) |
| *H04L 12/801* | (2013.01) |
| *H04L 12/715* | (2013.01) |

(52) U.S. Cl.
CPC .......... *H04L 41/12* (2013.01); *H04L 41/0813* (2013.01); *H04L 43/18* (2013.01); *H04L 45/38* (2013.01); *H04L 45/54* (2013.01); *H04L 12/28* (2013.01); *H04L 12/56* (2013.01); *H04L 29/12* (2013.01); *H04L 41/08* (2013.01); *H04L 45/64* (2013.01); *H04L 47/10* (2013.01)

(58) Field of Classification Search
CPC ......... H04L 45/38; H04L 49/70; H04L 12/56; H04L 47/10
See application file for complete search history.

(56) References Cited

U.S. PATENT DOCUMENTS

| | | |
|---|---|---|
| 2013/0117429 A1 | 5/2013 | Koponen et al. |
| 2013/0230047 A1 | 9/2013 | Subrahmaniam et al. |
| 2014/0098669 A1 | 4/2014 | Garg et al. |
| 2017/0091258 A1 | 3/2017 | Rajahalme |
| 2017/0264494 A1 | 9/2017 | Lim et al. |

FOREIGN PATENT DOCUMENTS

WO    2016053225 A1    4/2016

*Primary Examiner* — John D Blanton
*Assistant Examiner* — Aixa A Guadalupe Cruz
(74) *Attorney, Agent, or Firm* — Adeli LLP

(57) ABSTRACT

Some embodiments provide a novel method for installing flows of a desired network state in an actualized network state of a managed forwarding element. In some embodiments, the method maintains a flow output table based on flow events received from a computation engine for computing desired state, and from a set of managed forwarding elements on which the computed desired state is installed. The method of some embodiments then installs flows on the set of managed forwarding elements based on the flow output table.

20 Claims, 18 Drawing Sheets

200

| Datapath ID | Flow Table | Match Condition | Action |
|---|---|---|---|
| MFE1 | Table1 | A | 1 |
| MFE1 | Table1 | B | 1 |
| MFE2 | Table1 | A | 1 |
| MFE1 | Table2 | C | 1 |

METHOD AND MECHANISM FOR EFFICIENTLY MANAGING FLOWS

CLAIM OF BENEFIT TO PRIOR APPLICATION

This application is a continuation application of U.S. patent application Ser. No. 15/064,581, filed Mar. 8, 2016, now published as U.S. Patent Publication 2017/0264494. U.S. patent application Ser. No. 15/064,581, now published as U.S. Patent Publication 2017/0264494, is hereby incorporated by reference.

BACKGROUND

In virtualized networks, controllers manage physical forwarding elements to implement logical forwarding elements for logical networks. Controllers compute a desired network state that describes the desired forwarding behaviors for network traffic between the various elements of a logical network. Controllers compute flows to be installed on the managed forwarding elements (MFEs). The installed flows implement the desired network state by updating the actualized network state at the managed forwarding elements.

However, as the flows at the MFEs can be modified by several different controllers, by administrators of the network, etc., it is difficult to maintain a consistent view of the actualized network state and to identify changes that need to be made to the MFEs. In addition, without a consistent view of the desired and actualized network states, failures and disconnects within the network (e.g., when a controller or MFE fails) can cause an excess amount of churn within the network as flows at the MFEs are cleared and re-installed. As managed virtualized networks expand, it becomes increasingly difficult to efficiently manage flows for the various managed forwarding elements within a network system.

BRIEF SUMMARY

Some embodiments provide a novel method for installing flows of a desired network state in an actualized network state of a managed forwarding element (MFE). In some embodiments, the method maintains a flow entry output table (or flow output table) that includes (1) a reconciled set of flow records that stores records for flow entries determined to have a matching flow in both the actualized network state and the desired network state, (2) an extra set of flow records that stores records for flow entries determined to have a matching flow entry in the actualized network state, but not in the desired network state, and (3) a missing set of flow records that stores records for flow entriess determined to have a matching flow entry in the desired network state, but not in the actualized network state.

In some embodiments, a computation engine generates flow entries (also referred to as flows) for the desired state based on a logical network to be implemented on the managed forwarding element. The logical network of some embodiments includes various elements (e.g., virtual machines (VMs), logical forwarding elements, etc.) and is defined at a management plane based on user inputs (e.g., by an administrator of the logical network). The management plane of some embodiments works in conjunction with a set of central controllers to process the definition of the logical network and to distribute data for implementing the defined logical network to local controllers, which include the computation engines. In some embodiments, the local controllers each operate on a host machine with a managed forwarding element. The computation engine of the local controller generates flow entries based on the data received from the central controllers regarding the defined logical elements. The generated flow entries are then installed on the managed forwarding element by the local controller to implement the logical network by modifying the forwarding behavior of the managed forwarding element.

The flow entries of some embodiments include (1) an expression for matching against packets to be handled by the flow and (2) an action that describes an action to be performed for packets that match the expression. In some embodiments, the flow entry output table also includes a duplicate set of flow records that stores records for flow entries that are determined to have a same expression with another flow entry in the flow entry output table, but have a different action for the expression.

The method of some embodiments is performed by a flow entry output table of a controller that manages flow entries for multiple managed forwarding elements using the flow entry output table. In some such embodiments, each managed forwarding element has a unique identifier (e.g., a datapath identifier) that is used to distinguish records for flow entries of the particular managed forwarding element. In some embodiments, the records are stored in the sets of the flow entry output table using a set of identifiers (e.g., datapath ID, flow table ID, flow expression, etc.) used to identify each flow entry. In some embodiments, the flow entries (i.e., the particular combination of an expression and action) are unique to a single set of the flow output table.

The method of some embodiments maintains the sets of the flow entry output table to monitor the states of the MFE. The method maintains the sets by moving records for different flow entries between the different sets in response to flow events that describe changes in the flow entries installed at the MFE or desired by the computation engine. The flow events of some embodiments are received from both the computation engine and a set of managed forwarding elements. The flow event may indicate a change (e.g., addition or removal) of a flow entry in the desired network state (i.e., the network state computed by a computation engine) or a change of a flow entry in the actualized network state (i.e., the network state installed on the managed forwarding elements). In some embodiments, the flow event indicates that a managed forwarding element has connected to the MFE controller.

In some embodiments, flow events received from the MFE include events for flow entries that are not managed by the particular controller. The flow events may indicate that new flow entries have been added or removed, but the new flow entries may be required by other controllers, and should not be modified. In some embodiments, the MFE itself may create flow entries based on learning actions that should not be removed. In some embodiments, the controllers and the MFEs use a marker (e.g., a cookie, a prefix, or other identifier) to identify the source or type of each flow event. The controller of some such embodiments ignores flow entries that do not have a particular marker that is managed by the controller. In some embodiments, the controller maintains a list of special markers that indicate flows that are to be ignored.

When the controller receives a flow event, the method of some embodiments modifies the records for the flow entries stored in the sets of the flow output table. The method stores and removes records for the flow entries from the different sets for certain flow events, while moving records between the different sets for other flow events to maintain a current view of the desired and actualized network states. By maintaining the records of the flow output table, an administrator or other user can easily debug and inspect the overall controller and MFE state. In addition, by maintaining a single view of the desired and actualized states of the logical network and the MFEs, the method of some embodiments minimizes churn and memory requirements for the controllers in the network because fewer flow entries need to be stored and installed across the network.

As the flow output tables are updated, the method of some embodiments modifies the flow entries of the actualized network state based on the modified flow entry output table, allowing the method to bring the actualized network state in line with the desired network state. The method of some embodiments instructs the managed forwarding elements to add flow entries based on records stored in the missing set (i.e., flows that should be on the managed forwarding element, but are not), and instructs the managed forwarding element to remove flow entries based on records stored in the extra set (i.e., flows that are on the managed forwarding element, but should not be). In some embodiments, the missing and extra sets (or processing sets) are processed using a set of finite state machines (FSMs) that continuously (or periodically) process the records stored in the sets.

In some embodiments, as the records in the missing and extra sets are processed (i.e., instructions are sent to the managed forwarding elements), the records are marked as being sent, but remain in the missing and extra sets. The method of some embodiments registers the controller (or the flow output table) to receive callbacks for the various flow events, allowing the managed forwarding element to notify the controller of the status of the various flow entry changes (e.g., whether a particular flow entry was added correctly). When a flow entry is not updated correctly, the method of some embodiments marks the record in the missing or extra sets as unsent so that the FSMs can try to send the flow changes again. When the flow entry is updated successfully, the flow entry output table moves the records from the extra and missing sets to indicate that the changes were successful.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION OF THE INVENTION

Figure 1:
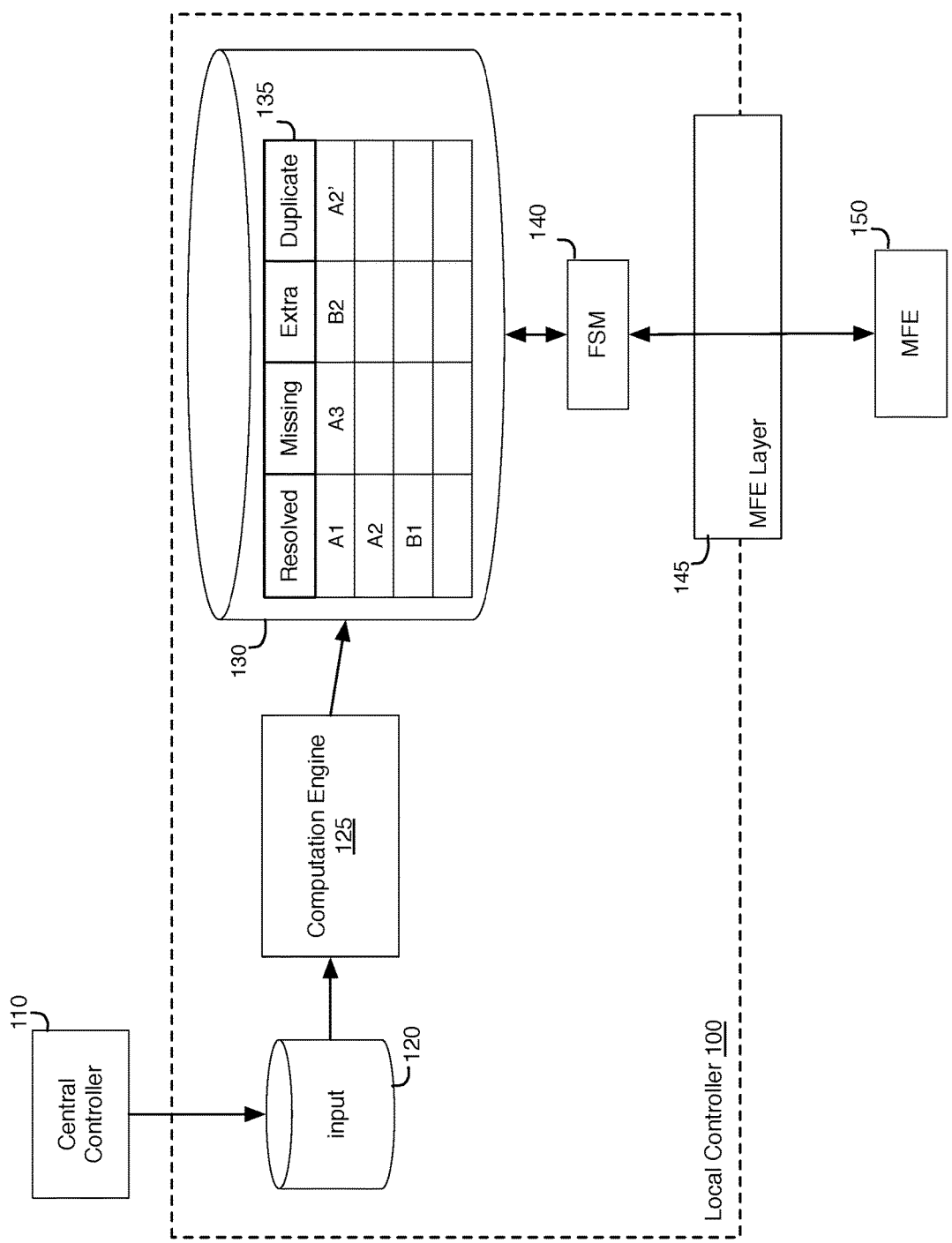
FIG. 1 illustrates an example of a network control system that uses MFE controllers to manage desired and actualized network states in a network.

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments provide a novel method for installing flows of a desired network state in an actualized network state of a managed forwarding element (MFE). In some embodiments, the method maintains a flow entry output table (or flow output table) that includes (1) a reconciled set of flow records that stores records for flow entries determined to have a matching flow in both the actualized network state and the desired network state, (2) an extra set of flow records that stores records for flow entries determined to have a matching flow entry in the actualized network state, but not in the desired network state, and (3) a missing set of flow records that stores records for flow entriess determined to have a matching flow entry in the desired network state, but not in the actualized network state.

In some embodiments, a computation engine generates flow entries (also referred to as flows) for the desired state based on a logical network to be implemented on the managed forwarding element. The logical network of some embodiments includes various elements (e.g., virtual machines (VMs), logical forwarding elements, etc.) and is defined at a management plane based on user inputs (e.g., by an administrator of the logical network). The management plane of some embodiments works in conjunction with a set of central controllers to process the definition of the logical network and to distribute data for implementing the defined logical network to local controllers, which include the computation engines. In some embodiments, the local controllers each operate on a host machine with a managed forwarding element. The computation engine of the local controller generates flow entries based on the data received from the central controllers regarding the defined logical elements. The generated flow entries are then installed on the managed forwarding element by the local controller to implement the logical network by modifying the forwarding behavior of the managed forwarding element.

The flow entries of some embodiments include (1) an expression for matching against packets to be handled by the flow and (2) an action that describes an action to be performed for packets that match the expression. In some embodiments, the flow entry output table also includes a duplicate set of flow records that stores records for flow entries that are determined to have a same expression with another flow entry in the flow entry output table, but have a different action for the expression.

The method of some embodiments is performed by a flow entry output table of a controller that manages flow entries for multiple managed forwarding elements using the flow entry output table. In some such embodiments, each managed forwarding element has a unique identifier (e.g., a datapath identifier) that is used to distinguish records for flow entries of the particular managed forwarding element. In some embodiments, the records are stored in the sets of the flow entry output table using a set of identifiers (e.g., datapath ID, flow table ID, flow expression, etc.) used to identify each flow entry. In some embodiments, the flow entries (i.e., the particular combination of an expression and action) are unique to a single set of the flow output table.

The method of some embodiments maintains the sets of the flow entry output table to monitor the states of the MFE. The method maintains the sets by moving records for different flow entries between the different sets in response to flow events that describe changes in the flow entries installed at the MFE or desired by the computation engine. The flow events of some embodiments are received from both the computation engine and a set of managed forwarding elements. The flow event may indicate a change (e.g., addition or removal) of a flow entry in the desired network state (i.e., the network state computed by a computation engine) or a change of a flow entry in the actualized network state (i.e., the network state installed on the managed forwarding elements). In some embodiments, the flow event indicates that a managed forwarding element has connected to the MFE controller.

In some embodiments, flow events received from the MFE include events for flow entries that are not managed by the particular controller. The flow events may indicate that new flow entries have been added or removed, but the new flow entries may be required by other controllers, and should not be modified. In some embodiments, the MFE itself may create flow entries based on learning actions that should not be removed. In some embodiments, the controllers and the MFEs use a marker (e.g., a cookie, a prefix, or other identifier) to identify the source or type of each flow event. The controller of some such embodiments ignores flow entries that do not have a particular marker that is managed by the controller. In some embodiments, the controller maintains a list of special markers that indicate flows that are to be ignored.

When the controller receives a flow event, the method of some embodiments modifies the records for the flow entries stored in the sets of the flow output table. The method stores and removes records for the flow entries from the different sets for certain flow events, while moving records between the different sets for other flow events to maintain a current view of the desired and actualized network states. By maintaining the records of the flow output table, an administrator or other user can easily debug and inspect the overall controller and MFE state. In addition, by maintaining a single view of the desired and actualized states of the logical network and the MFEs, the method of some embodiments minimizes churn and memory requirements for the controllers in the network because fewer flow entries need to be stored and installed across the network.

As the flow output tables are updated, the method of some embodiments modifies the flow entries of the actualized network state based on the modified flow entry output table, allowing the method to bring the actualized network state in line with the desired network state. The method of some embodiments instructs the managed forwarding elements to add flow entries based on records stored in the missing set (i.e., flows that should be on the managed forwarding element, but are not), and instructs the managed forwarding element to remove flow entries based on records stored in the extra set (i.e., flows that are on the managed forwarding element, but should not be). In some embodiments, the missing and extra sets (or processing sets) are processed using a set of finite state machines (FSMs) that continuously (or periodically) process the records stored in the sets.

In some embodiments, as the records in the missing and extra sets are processed (i.e., instructions are sent to the managed forwarding elements), the records are marked as being sent, but remain in the missing and extra sets. The method of some embodiments registers the controller (or the flow output table) to receive callbacks for the various flow events, allowing the managed forwarding element to notify the controller of the status of the various flow entry changes (e.g., whether a particular flow entry was added correctly). When a flow entry is not updated correctly, the method of some embodiments marks the record in the missing or extra sets as unsent so that the FSMs can try to send the flow changes again. When the flow entry is updated successfully, the flow entry output table moves the records from the extra and missing sets to indicate that the changes were successful.

An overview of the process for using a flow output table to install flows to implement a desired network state has been described above. Further details and examples of the controllers and the flow output tables are described below. Specifically, Section I describes a MFE controller with a flow output table for installing flows at MFEs. Section II describes processes for updating the flow output tables in response to different flow events. Section III then describes examples of maintaining the flow output tables and handling of the different flow events. Finally, section IV describes an electronic system with which some embodiments of the invention are implemented.

I. MFE Controllers with Flow Output Tables

A MFE controller is responsible for ensuring that the correct flows are installed at managed forwarding elements managed by the MFE controller. In some embodiments, the MFE controller is a local controller that operates on a host machine and manages a software forwarding element that operates on the host machine. The MFE controller needs to ensure that at any point in time, the MFEs have the correct flows (i.e., the controller's desired state matches with the MFEs' actualized state). Flows in the MFEs can be added, updated, or removed from outside of the MFE controller (e.g., manually through a command-line interface, by other controllers, etc.). The controller needs to be able to detect discrepancies between the desired and actualized states, to re-install flows that are desired, and to delete flows that are not desired.

FIG. 1 illustrates an example of a network control system that uses MFE controllers to manage desired and actualized network states in a network. This example illustrates a central controller 110, local controller 100, and managed forwarding element (MFE) 150. The central controller 110 of some embodiments manages and implements logical datapath sets (LDPS) (e.g., logical switches, logical routers, etc.) of logical networks by communicating with local controllers which managed the MFEs.

The central controller 110 of some embodiments manages a logical control plane, receiving definitions of logical forwarding elements (or LDPS) in a logical network and creating logical forwarding data for the local controller 100, which processes the logical forwarding data to implement the logical forwarding elements on the managed forwarding elements (MFEs) of the physical network. In some embodiments, the central controller 110 is a cluster of central controllers that manage multiple LDPS for several logical networks.

In some embodiments, the local controller 100 is one of several local controllers that manage the forwarding behaviors of managed forwarding elements in a network (e.g., in a datacenter) by generating flows that are sent to the managed forwarding elements. In some embodiments, MFE 150 is a software managed forwarding element, and the local controller 100 and the MFE 150 operate on a host machine, along with a set of virtual machines.

In some embodiments, the invention is implemented in other controller architectures. For example, in some embodiments, rather than a local controller that operates on each host machine to manage a single MFE, a cluster of central controllers is used to manage and generate flows for numerous NIFEs operating on numerous host machines. In some such embodiments, a single controller may manage several different NIFEs operating on different host machines, and stores the described tables for each MFE that it manages.

In this example, the local controller 100 shows an input storage 120, computation engine 125, flow output table 130, finite state machine (FSM) 140, and MFE layer 145. The input storage 120 stores the logical information (e.g., logical forwarding data) from the central controller 110. In some embodiments, the input storage 120 also stores physical information (e.g., port data, etc.) received from the MFE 150. The computation engine 125 of some embodiments processes the inputs in the input storage 120 to compute flows for the flow output table 130 to be installed on the MFE 150. In some embodiments, the flows comprise flow entries or data tuples that modify the behaviors of the forwarding elements.

At a high-level, flow output table 130 manages the various flows by adding and removing flows, as well as moving flows between the different sets based on add/delete flow events received from the computation engine 125 and the MFE 150. The flow output table 130 of some embodiments represents an integration layer that receives and processes the add/delete flow events from both the computation engine 125 and the MFE 150. The computation engine 125 has the full desired state of the MFE flows (i.e., based on the configuration it received from the central control plane, etc.), and as the desired state changes, it triggers an add or delete event to the flow output table 130. The MFEs of some embodiments send added/deleted flow events as flows are added to or removed from the flow tables of the MFEs. The flow output table 130 stores records for the different flows in the different sets to allow the flow output table 130 to add and remove flows as necessary from the MFE 150.

In some embodiments, each local controller 100 maintains a single flow output table 130, which maintains records for the generated flows in several sets of records 135 to manage the flows desired by the computation engine 125 and the flows actualized on the MFE 150.

In a large virtual networking topology, the number of desired flows can become very large. An efficient way to manage the flows in the MFEs is needed that is also easy to debug and to inspect the overall controller and MFE state. In some embodiments, the flow output table 130 includes records for the whole space of what's desired and what's not needed in the MFE 150. By centralizing the desired state and actualized state for the network in the flow output table 130, controllers do not need to maintain redundant copies of the flows, which results in a lower controller memory footprint. Moreover, since redundant copies of the flows are not stored, debugging and inspecting the controller state is simpler because the state of the flows can be inspected by inspecting the flows stored in the flow sets of the flow output table 130.

In addition, the centralized network state of the flow output table 130 allows for reduced network flow churn, particularly in the case of controller and MFE startup. As the local controller does not know what flows are installed at the MFE when the MFE initially connects to the local controller, some systems remove all of the flows at the newly connected MFE to ensure that no old flows are used as a part of the actualized network state. However, wiping and re-installing all of the flows in the MFE can cause extended periods of datapath disruption and creates congestion in the network as flows are unnecessarily re-sent to an MFE. By maintaining a view of the desired and actualized state, the flow output table is able to reduce the unnecessary sending and re-installation of existing flows.

Figure 2:
FIG. 2 illustrates an example of a data structure for flow records stored at the network controller.

In some embodiments, the flow output table 130 stores data structures for the various flows of the desired and actualized network states in the different sets (i.e., reconciled, extra, missing, and duplicate). FIG. 2 illustrates an example of a data structure for flow records stored at the flow output table of the network controller. This example shows four records for four flows. Each record includes a datapath ID 205, a flow table identifier 210 and a flow, which includes a match condition 215, and an action 220.

The datapath ID 205 indicates the datapath for the flow. As described above, a controller of some embodiments manages several different MFEs on multiple different host machines. In some such embodiments, each MFE managed by the controller has a unique datapath ID. The flow table identifier 210 indicates the flow table of the MFE in which the flow is stored.

The match condition 215 (or expression) and the action 220 make up the actual flow itself. The match condition 220 indicates a match condition for packet headers processed by the flow at the MFE. The action 225 indicates the action that is to be taken (e.g., forward, drop, modify, etc.) for each packet at the MFE with a header that matches with the match condition.

Although, in this example, each flow is shown as a separate record, different embodiments use other data structures to store the flows in the sets of the flow output table. For example, in some embodiments, the flow output table stores the flows in a data structure made up of a map of a map of a set of flows. Each datapath ID is mapped to a flow table ID, which is mapped to the set of flows (with their expressions and actions) for the flow table on the MFE.

The set of flows of some embodiments is a multi-index set. The multi-index set allows the flow output table to iterate through the flows in different orders based on different properties (i.e., when the flow was added, whether the flow has been sent, etc.). In some embodiments, the flows (or portions of the flows) in the set are hashed to facilitate checking the flow sets for uniqueness. The hashing allows for each flow to be quickly checked, rather than checking each expression in the flows. The data structures are stored in the sets of the flow output table and manipulated using various functions that operate on the data structure instances and their elements (e.g., the set of flows).

In some embodiments, the flow records of the processing sets (i.e., the missing set and the extra set) further include a sent value, indicating whether the record has been sent to the MFE. In some embodiments, the records remain in the processing sets (i.e., the missing and extra sets) until the flow output table confirms that the flows have successfully been installed and the records can be removed or moved to one of the other sets.

Referring back to FIG. 1, the flow output table 130 classifies a flow into one of 4 types: reconciled, extra, missing, duplicate. Flows of the same type are stored in a set-like data structure in the local controller 100. In this example, flow output table 130 includes a reconciled set, a missing set, an extra set, and a duplicate set.

The reconciled set stores records for flows that are desired by the controller and also are in MFE. At steady state, all of the flows should eventually be in the reconciled state. The extra set stores records for flows that are in MFE, but not desired by the controller (i.e., are not a part of the desired state). The missing set stores records for flows that are not in MFE, but are desired by the controller. The duplicate set stores records for flows computed (desired) by the controller but the expression of the flow already exists in reconciled or missing. In some embodiments, the flows in the duplicate set store new state that is different from previously installed state that hasn't been removed yet. The flow output table of some embodiments automatically adds state from the duplicate set to the desired state (e.g., adds the flow to the missing set to be installed at the MFE) when previously reconciled state is removed.

In some embodiments, a data structure for a flow is unique across the reconciled, extra, and missing sets, meaning no exact match (i.e., both expression and action) for a flow will be found in more than one set of the flow output table. However, it is possible in some embodiments for near matches of a flow (i.e., where the expression matches, but the actions are different) to be found in more than one of the different sets. This is different from the flow tables of the MFEs, where only one flow for any given expression can be installed at a given time, because a new flow with a same expression would overwrite an existing flow.

The records for flows in the processing sets (i.e., missing set and extra set) indicate flows that either need to be added to or removed from the network state of the MFE 150. The processing sets allow for asynchronous modifications to the state so that the computation engine 125 is not held up waiting for changes to be implemented at the MFE 150. The changes are stored in the processing sets until they can be processed and installed at the MFEs.

In some embodiments, the controller 100 includes a finite state machine (FSM) 140 for sending and resending the records in the missing and extra sets. The FSM 140 of some embodiments checks whether the appropriate MFEs are connected, and sending the records at various time intervals.

For example, in some embodiments, the FSM 140 processes the records constantly in order to ensure that the most current version of the desired network state is implemented on the MFE 150. In other embodiments, the FSM 140 processes the records periodically in order to ensure that the processing for the local controller 100 (e.g., computations of the computation engine 125) are not delayed.

By maintaining the changes to be made to the MFE 150 in the processing sets, the computation engine can send all of the flows that it generates for the desired state to the flow output table, without having to be concerned with the implementation on the MFE 150. The FSM 140 of some embodiments is a simple module that only worries about sending, is not concerned with whether they are applied or not. FSM just checks what needs to be sent and whether it can be sent.

In some embodiments, the FSM 140 has additional logic to manage the consumption of processing resources of the local controller 100. In some embodiments, the FSM 140 is configurable to manage the amount of processing time that is consumed for sending the flows from the processed tables in order to ensure that the other processes running on the local controller 100 (e.g., the computation engine 125).

The FSM 140 of some embodiments communicates with the MFE 150 through a MFE layer 145. The MFE layer 145 of some embodiments exposes a set of helper functions that FSM 140 uses to send flow updates and to register for callbacks from the MFEs 150. The MFE layer 145 that serves as a conduit to the MFE 150.

As described above, the flow output table stores the records for the flows in the different sets based on various flow events that are received. The following section describes processes for handling the different flow events received from the computation engine and the MFEs.

II. Maintaining Flow Output Tables

This section describes several processes performed by a flow output table, such as the one described above with reference to FIGS. 1 and 2, in response to different events. Examples of the interactions of the different flow events are described below in Section III.

A. Updates from the Computation Engine

Figure 3:
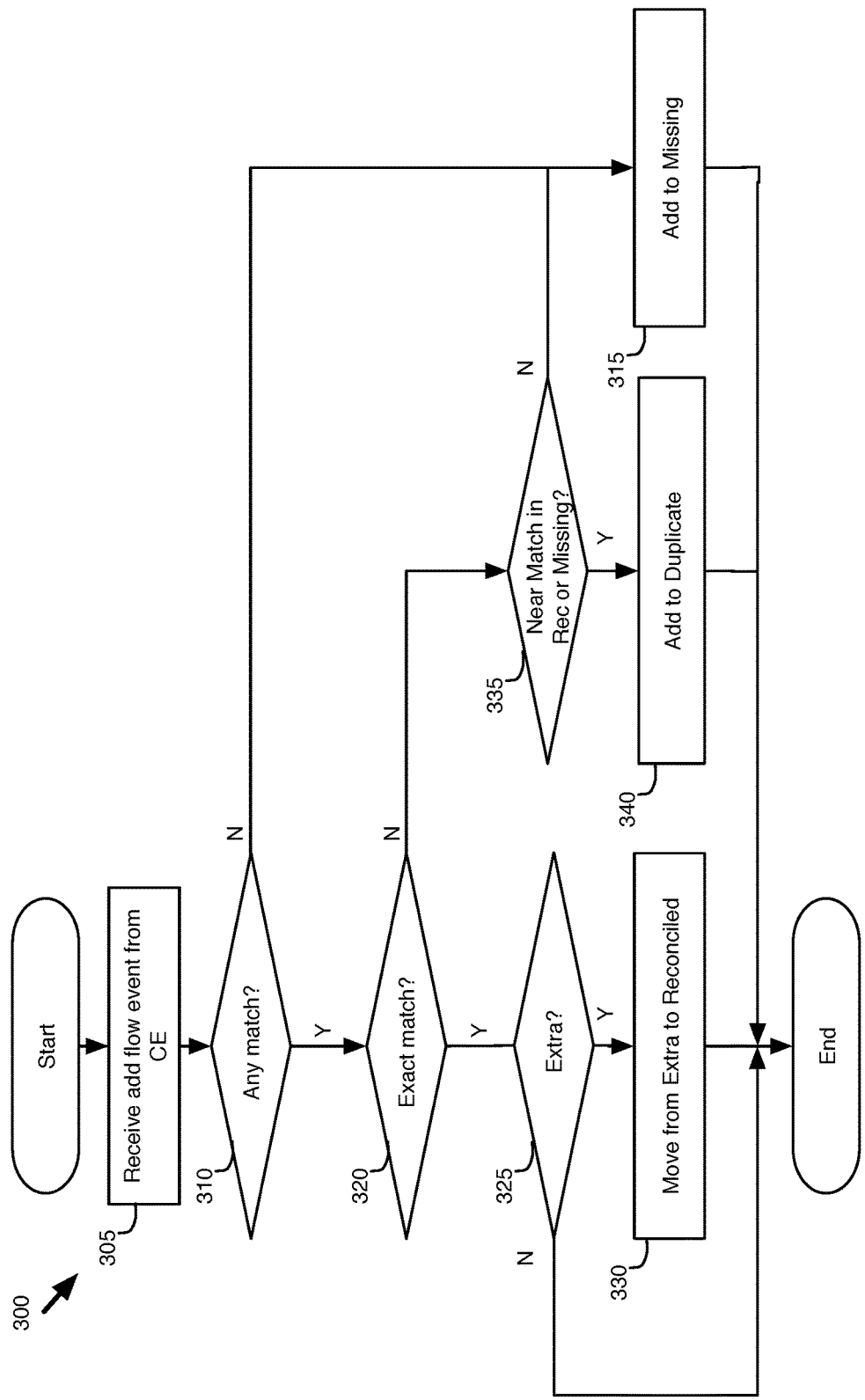
FIG. 3 conceptually illustrates a process for handling add flow events received from a computation engine.

FIG. 3 conceptually illustrates a process for handling add flow events received from a computation engine. The process 300 of some embodiments is performed by the flow output table. The process 300 begins by receiving (at 305) an add flow event from the computation engine that indicates that a particular flow has been added to the desired state.

The process 300 then determines (at 310) whether the received flow event is to add a flow that is any kind of match for an existing flow in the flow output table. When the process 300 determines (at 310) that the received flow event does not match any existing flow (i.e., is a new flow), the process 300 adds (at 315) the flow to the missing set. As described above, the flows in the missing set are then processed by a finite state machine to install the flows on the MFEs.

When the process 300 determines (at 310) that the new flow does match an existing flow, the process 300 determines (at 320) whether the new flow is an exact match for an existing flow. An exact match occurs when both the expression and the action of the new flow match with the expression and the action of the existing flow. A near match would occur when only the expression matches between the new and existing flows (i.e., the flows describe different actions to be performed for packets matching a particular expression).

When the process 300 determines (at 320) that the flow has an exact match, the process 300 determines (at 325) whether the exact match is with a flow in the extra set (i.e., a flow on the MFE that was not previously needed). When the process 300 determines (at 325) that the exact match is in the extra set, the process moves (at 330) the flow from the extra set to the reconciled set, indicating that the previously-extra flow on the MFE is now correct and should not be deleted.

For example, in some cases the MFE adds a particular flow before the computation engine instructs the flow output table to add the particular flow, such as when the flow is added to the MFE by another controller (e.g., a rogue controller, another controller in a central controller cluster after failover, etc.). When the MFE reports the new flow, the flow output table marks the flow for deletion, but when the computation engine adds the new flow, the flow output table can reconcile the flow without adding or deleting anything from the MFE.

When the process 300 determines (at 325) that the exact match is not in the extra set (i.e., is in the reconciled, missing, or duplicate sets), the process ends. An exact match in one of the other sets indicates that the flow is already being handled (i.e., has already been reconciled, is already set to be added to the MFE, or has already been added to the duplicate set).

When the process 300 determines (at 320) that the new flow is not an exact match, the process determines (at 335) whether a near match (i.e., a match on the expression for the flow) exists in the reconciled or missing sets. When the process 300 determines (at 335) that a near match already exists in either the reconciled or missing sets, the process 300 adds (at 340) the new flow to the duplicate set. A near match indicates that a previous flow for the particular expression has already been received and is either installed at the MFE or queued up to be installed. In such a case, the near match flow is stored in the duplicate set as a backup flow in case the current flow is removed from the reconciled or missing sets.

When the process 300 determines (at 335) that a near match does not exist in the reconciled or missing sets (i.e., there is a near match in extra), the process 300 adds (at 315) the new flow to the missing set and the process ends. A near match in the extra set indicates that the near match flow is to be deleted, so much like no match at all, indicates that there is currently no flow for the given expression. The new flow can then be added to the missing set to be installed on the MFE. There should never be a near match in the duplicate set without a near match in reconciled or missing, as a flow should not be added to the duplicate set without such a match.

Figure 4:
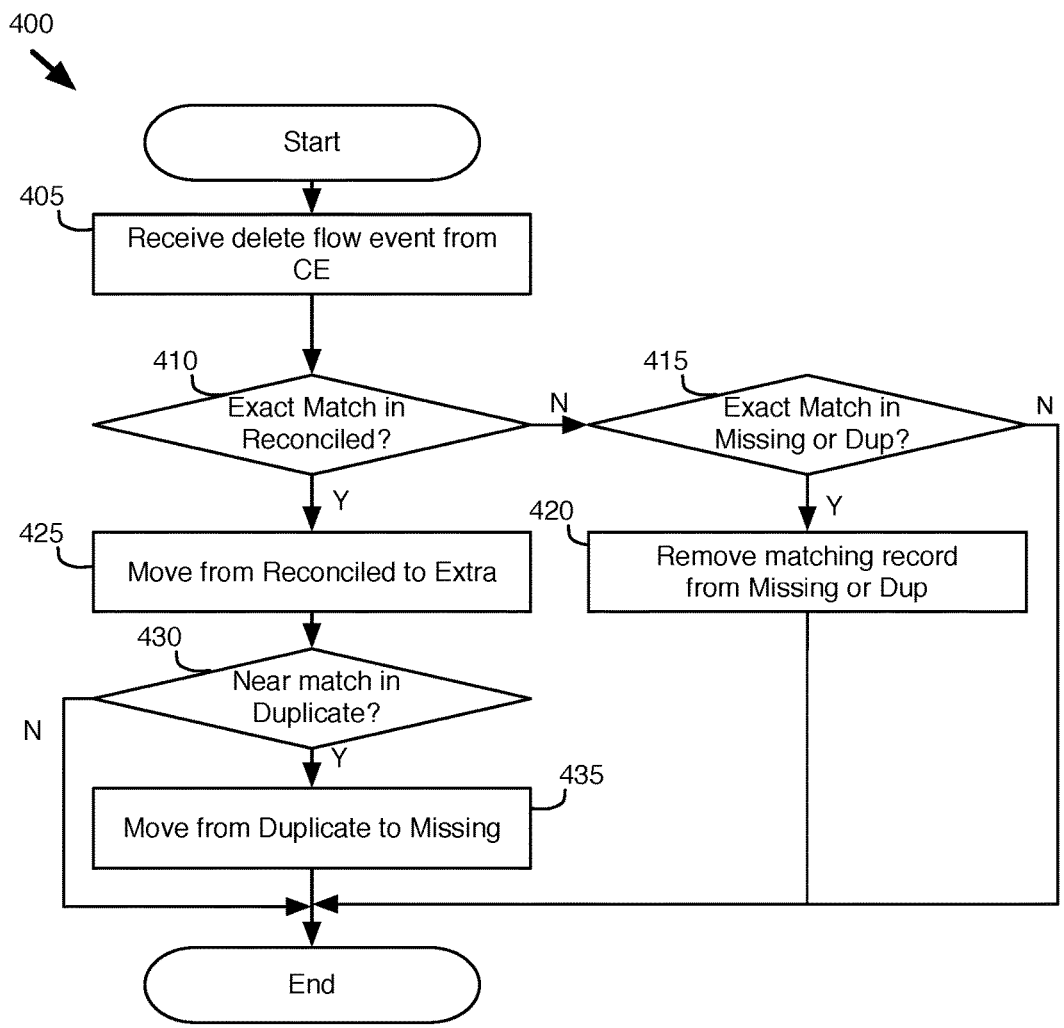
FIG. 4 conceptually illustrates a process for handling delete flow events received from a computation engine.

FIG. 4 conceptually illustrates a process for handling delete flow events received from a computation engine. The delete flow event indicates a flow that is to be removed from the desired state (and the actualized state at the MFEs). The process 400 receives (at 405) a delete flow event from the computation engine.

The process 400 then determines (at 410) whether there is an exact match for the flow to be deleted in the reconciled set. When the process 400 determines (at 410) that there is no exact match for the flow to be deleted in the reconciled set and determines (at 415) that there is no exact match in the missing set or the duplicate set (i.e., near match in the extra set or no match), the process ends as there is no corresponding flow to be removed.

When the process 400 determines (at 415) that there is an exact match in the missing set or the duplicate set, the process removes (at 420) the matching record and then ends. A match in the missing or duplicate sets indicates that the flow to be removed is not currently installed at the MFE, so the record can be removed and no changes need to be sent to the MFE.

When the process 400 determines (at 410) that there is an exact match in the reconciled set (i.e., the computation engine wants to remove a current flow installed at the MFE), the process 400 moves (at 425) the flow from the reconciled set to the extra set, preparing the flow to be deleted from the MFE.

Figure 5:
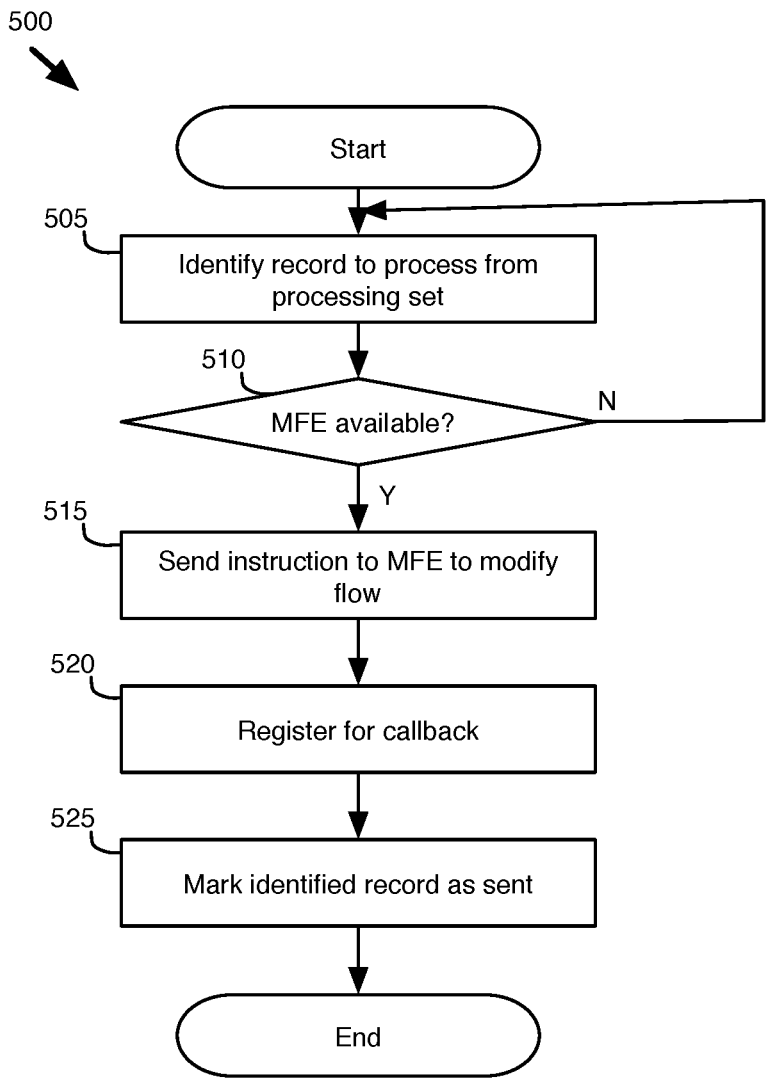
FIG. 5 conceptually illustrates a process for handling network state in an output table.

After the match flow is set to be deleted, the process 400 then determines (at 430) whether a near match for the match flow exists in the duplicate set. When there is no near match, the process 400 ends. When the process 400 determines (at 430) that there is a near match in the duplicate set, the process moves the near match flow from the duplicate set to the missing set, to be installed at the MFE by the FSM. Such a flow could be found in the duplicate set when a near match (e.g., a new version of the flow) was received from the computation engine prior to the receipt of the command to remove the flow that it replaces. The process then ends. As described above, the processing sets store records for changes to be made to the flows at the MFEs. FIG. 5 conceptually illustrates a process for handling flow records in a processing set of a flow output table. The process 500 identifies (at 505) a record in one of the processing sets (i.e., the missing set or the extra set) of the flow output table. Each record in the missing set indicates that a flow for the record is to be added to the MFE, while each record in the extra set indicates that a flow for the record is to be removed from the MFE.

In processing the records, the processing sets of some embodiments include records for flows that need to be sent, as well as records for flows that have already been sent to the MFEs, but whose installation is not confirmed. In some such embodiments, the process 500 only identifies records that are not marked as sent (i.e., records for which instructions have not already been sent to the MFEs).

The process 500 then determines (at 510) whether the managed forwarding element for the record is connected. As described above with reference to FIG. 2, each record identifies the MFE for the flow. When the process determines that the managed forwarding element is not connected or available, the process 500 identifies (at 505) another record to process. When the process 500 determines (at 510) that the managed forwarding element is available, the process sends (at 515) an instruction to add or remove the flow for the processed record to the MFE. The process 500 of some embodiments then registers (at 520) for callbacks to trigger an event to the flow output table based on whether or not MFE has successfully applied the message.

Finally, the process 500 marks (at 525) the record for the flow as sent. The record will then remain in the processing set (either the missing set or the extra set) until a response to the callback is received by the flow output table. If the flow is not added or removed successfully, then the record is marked as unsent so that the FSM can resend the instructions for the record. For flows that are to be added, if the flow is added successfully, the record for the flow is moved from the missing set to the reconciled set. For flows that are to be removed, if the flow is removed successfully, the record for the flow is deleted from the extra set.

B. Updates from the MFE

Figure 6:
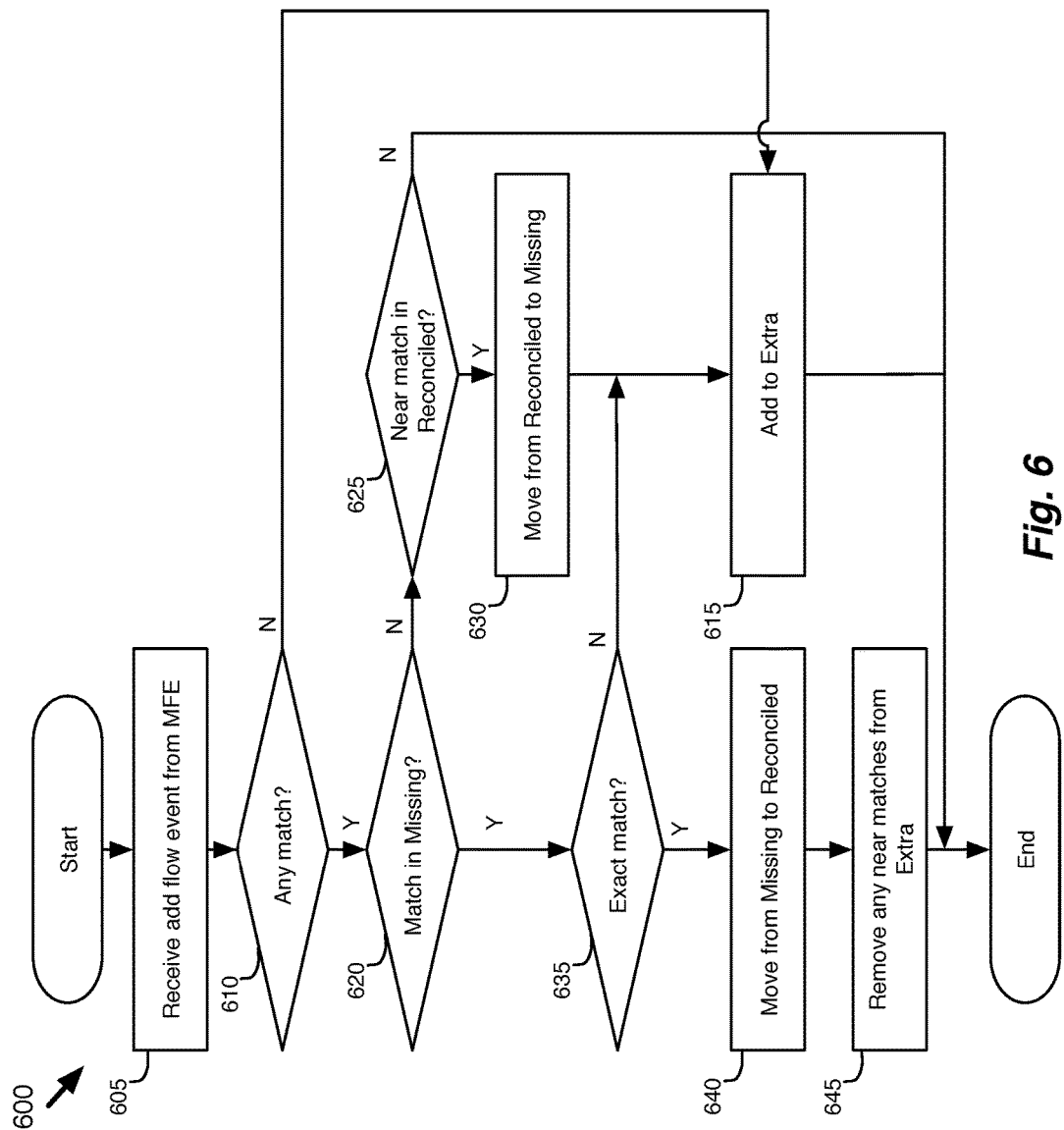
FIG. 6 conceptually illustrates a process for handling added flow events received from a managed forwarding element.

The flow output table also handles flow events that describe changes to the flows at the MFEs. FIG. 6 conceptually illustrates a process for handling added flow events received from a managed forwarding element. The process 600 receives an added flow event from the MFE, indicating that the MFE has added a new flow. The added flow event may be triggered by a response from the MFE to a callback set by the FSM, to indicate that the flow has been successfully installed. The process 600 determines (at 610) whether the new flow matches with any of the existing flows in the flow output table. When the process 600 determines that the new flow does not match with any of the other flows (i.e., is a new and unrecognized flow), the process 600 adds (at 615) the new flow to the extra set to be removed by the FSM and the process ends.

When the process 600 determines (at 610) that the new flow does match a flow in the flow output table, the process determines (at 620) whether the match is in the missing set. When the process 600 determines (at 620) that the matching flow is in the missing set, the process determines (at 635) whether the match is an exact match.

When the process 600 determines (at 635) that the match is an exact match with a flow from the missing set (i.e., the new flow is queued to be installed at the MFE), the process moves (at 640) the matching flow from the missing set to the reconciled set because the flow has already been installed at the MFE and is reconciled with the desired network state. The process 600 then removes (at 645) any near matches from the extra set because the added flow event indicates the actual flow that is installed at the MFE, so any near match flows in the extra set are not on the MFE and so do not need to be deleted.

When the process determines (at 635) that the match in the missing set is not exact (i.e., a different version of the flow is to be added to the MFE), the process 600 adds (at 615) a record for the new flow to the extra set so that it can be deleted from the MFE, and the process ends.

When the match is not in the missing set, the process 600 determines (at 625) whether there is a near match in the reconciled set. When there is no near match in the reconciled set (i.e., there is a match, but it is in one of the other sets), the process ends. Any match in the other sets (i.e., extra set, duplicate set) or an exact match in the reconciled set, would indicate that the new flow is already being handled (i.e., is already set to be replaced, added, or removed).

When the process 600 determines (at 625) that there is a near match in the reconciled set, it means that the flow output table incorrectly indicates that a different version of the flow (i.e., the near match) is installed on the MFE. The process 600 moves (at 630) the near match flow from the reconciled set to the missing set to re-install the reconciled flow. The process 600 then adds (at 615) the added flow to the extra set to be deleted and the process ends.

Figure 7:
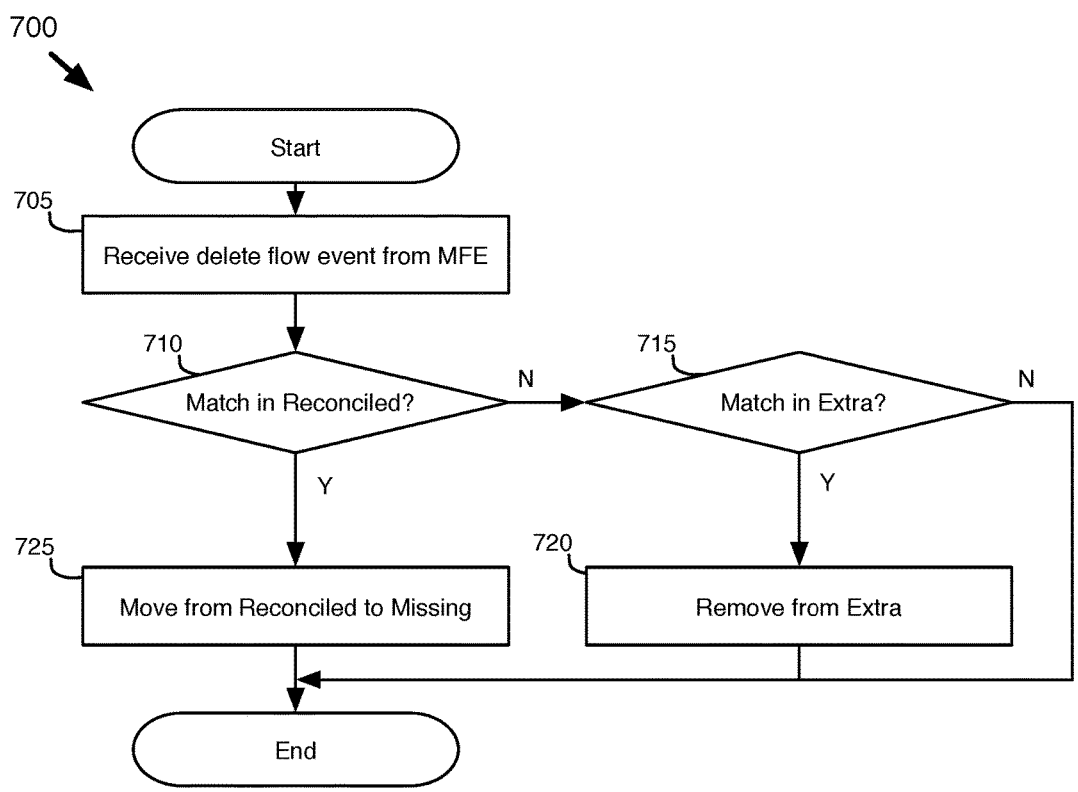
FIG. 7 conceptually illustrates a process for handling deleted flow events received from a managed forwarding element.

FIG. 7 conceptually illustrates a process for handling deleted flow events received from a managed forwarding element. The process 700 receives (at 705) a deleted flow event that indicates a flow that has been removed from the MFE. The process 700 determines (at 710) whether the deleted flow matches a flow in the reconciled set. When the process 700 determines (at 710) that the flow is in the reconciled set (i.e., the flow that was deleted was previously reconciled), the process moves the flow from the reconciled set to the missing set to be re-added to the MFE and the process ends.

When the process 700 determines (at 710) that the deleted flow does not match a flow in the reconciled set, the process determines (at 715) whether the deleted flow matches a flow in the extra set. When the process 700 determines (at 715) that the flow is in the extra set (i.e., the flow is set to be deleted), the process removes the deleted flow from the extra set because the deleted flow event indicates that the flow has already been removed. The process then ends.

When the process 700 determines (at 715) that the deleted flow is not in the extra set (i.e., is in the missing or duplicate sets), the process ends because it is already set to be re-added, or shouldn't have been on the MFE. Examples of the interactions between the different flow events are described in the next section.

III. Examples of Maintaining Flow Output Tables

A. Updates from Desired Network State

The computation engine of some embodiments generates flows for installation on the managed forwarding elements. The flows describe a desired network state generated by the computation engine. In some embodiments, the desired state is based on inputs received from a central controller that distributes the inputs to several local controllers operating on host machines in the network. The computation engine generates the output flows and sends flow events to the flow output table at the local controller.

Figure 8A:
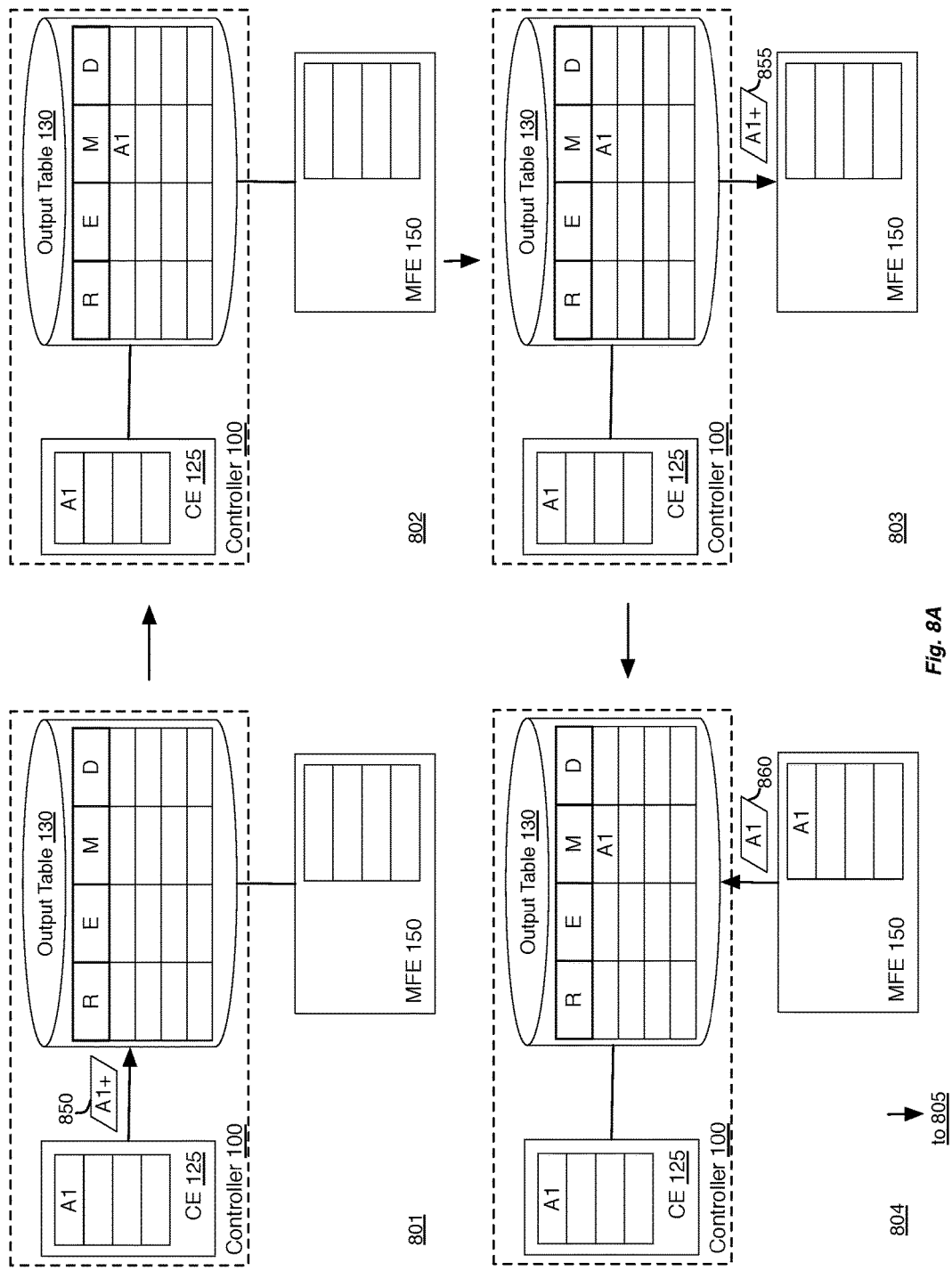
FIGS. 8A-B illustrate an example of adding and reconciling new network state.
Figure 8B:
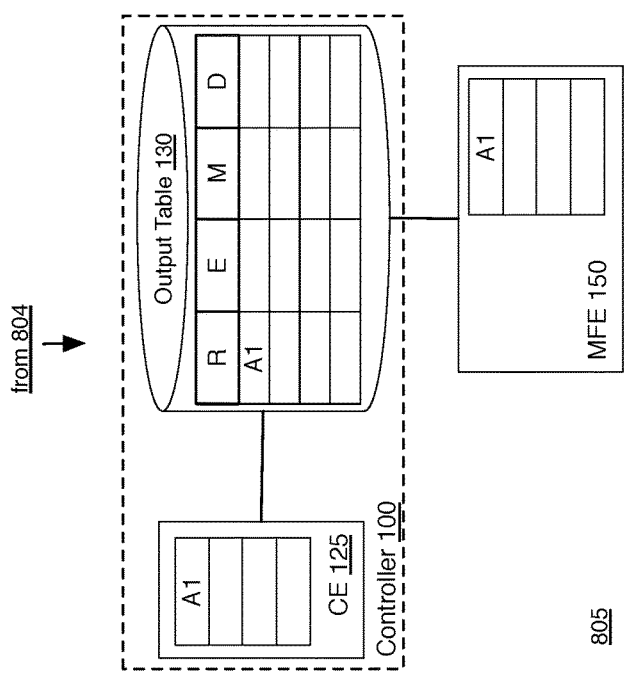

FIGS. 8A-B illustrate an example of adding and reconciling new network state in five stages 801-805. The examples of this figure and the figures below are described with reference to the controller 100 and MFE 150, as described above with reference to FIG. 1. Although the examples are described with a single MFE, a controller may manage the state for multiple MFEs.

The first stage 801 shows that the computation engine 125 of the controller 100 contains a single flow A1 (with expression A and action 1) as a part of the desired state. The first stage 801 also shows that the computation engine 125 sends an add flow event 850 to add flow A1 to the flow output table 130. MFE 150 does not yet have any flows in the actualized state.

The second stage 802 shows that the flow output table 130 has added a record for the flow A1 to the missing set. The missing set stores records for flows that are a part of the desired state computed by the computation engine, but are not yet added to the MFEs 150. The third stage 803 shows that the output table 130 (or a FSM) sends an instruction 855 to the MFE 150 to add flow A1. In some embodiments, the controller 100 registers for callbacks for the flows that are to be added at the MFE.

In the fourth stage 804, the MFE 150 sends a callback response 860 back to the controller 100 and to the output table 130, indicating that the new flow A1 has been successfully added to the MFE 150. Finally, the fifth stage 805 shows that the output table 130 has moved the record for the new flow A1 from the missing set to the reconciled set, indicating that the desired state of the computation engine 125 matches the actualized state of the MFE 150.

Figure 9:
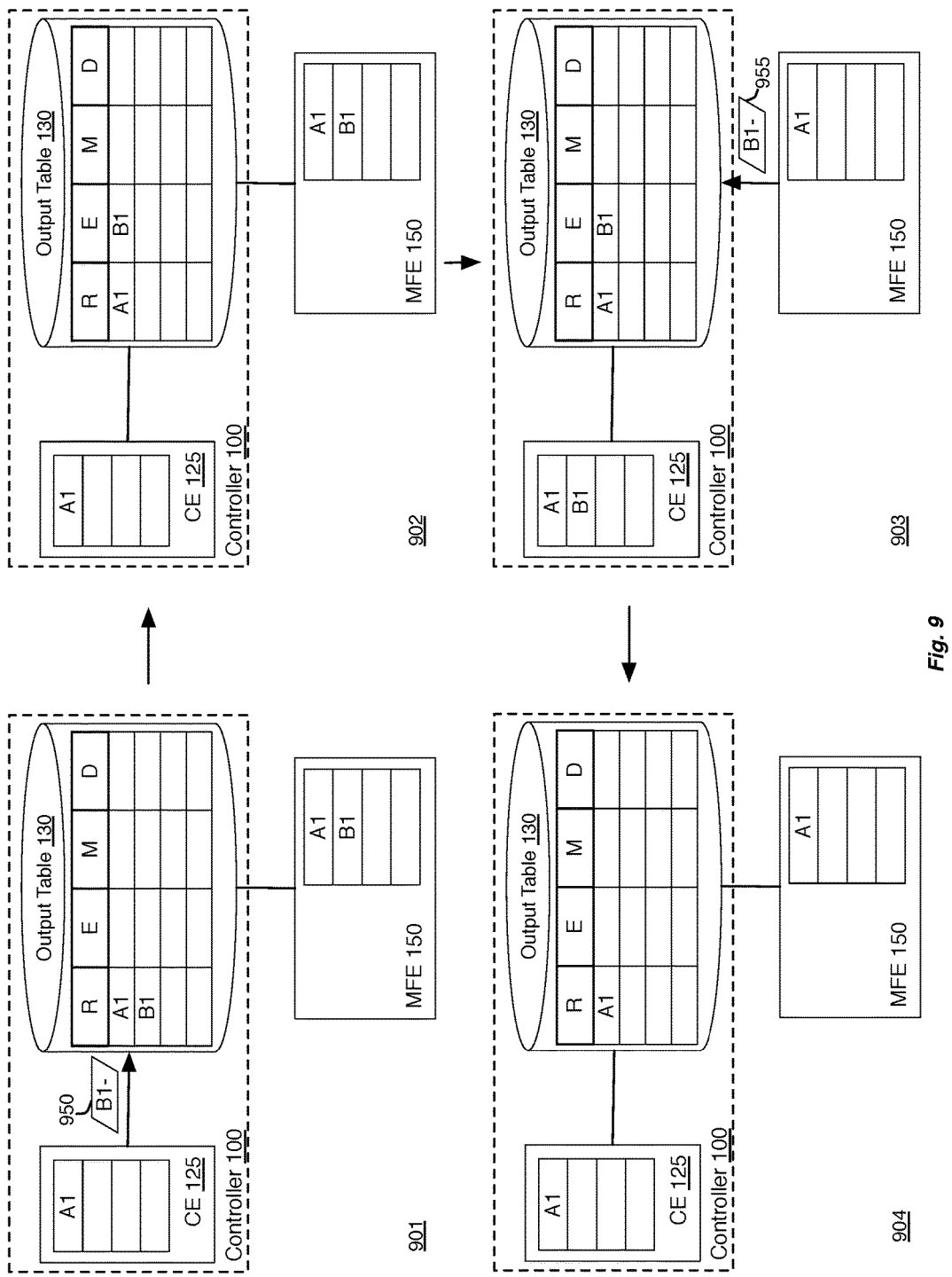
FIG. 9 illustrates an example of removing and reconciling existing network state.

FIG. 9 illustrates an example of removing and reconciling existing network state in four stages 901-904. The first stage 901 illustrates that the computation engine has removed a flow B1 from its desired state, and sends a delete flow event 950 to the flow output table 130. The flow B1 is currently installed on the MFE 150 and so a record for the flow B1 is stored in the reconciled set at the flow output table 130.

The second stage 902 shows that the flow output table 130 has moved the record for the flow B1 from the reconciled set to the extra set. As the flow output table (or a finite state machine for processing records in the flow output table) processes the records of the processing sets of the flow output table, it will eventually instruct the MFE 150 to remove the flow B1.

However, in this example, in the third stage 903, the MFE 150 sends a delete flow event 955 to indicate that flow B1 has been removed from the MFE 150. This may be a response to a callback set for a delete instruction from the controller 100, or may have been triggered by a change at the MFE 150 initiated by another controller or by the MFE 150 itself.

The fourth stage 904 shows that the flow output table, based on the delete flow event 955, has removed the record for the flow B1 from the extra set. In the fourth stage 904, the desired network state at the computation engine 125 and the actualized network state of the MFE 150 match and are fully reconciled, so all of the records in the flow output table 130 are in the reconciled set.

B. Handling Duplicate Network State

In some cases, the flow events from the computation engine are near matches for flows that are already stored at the flow output table. The near matches indicate that it is unclear whether the near match flows are correct, or whether the previously stored flows are correct. In some embodiments, the near match flows are stored in a duplicate set of the flow output tables.

Figure 10A:
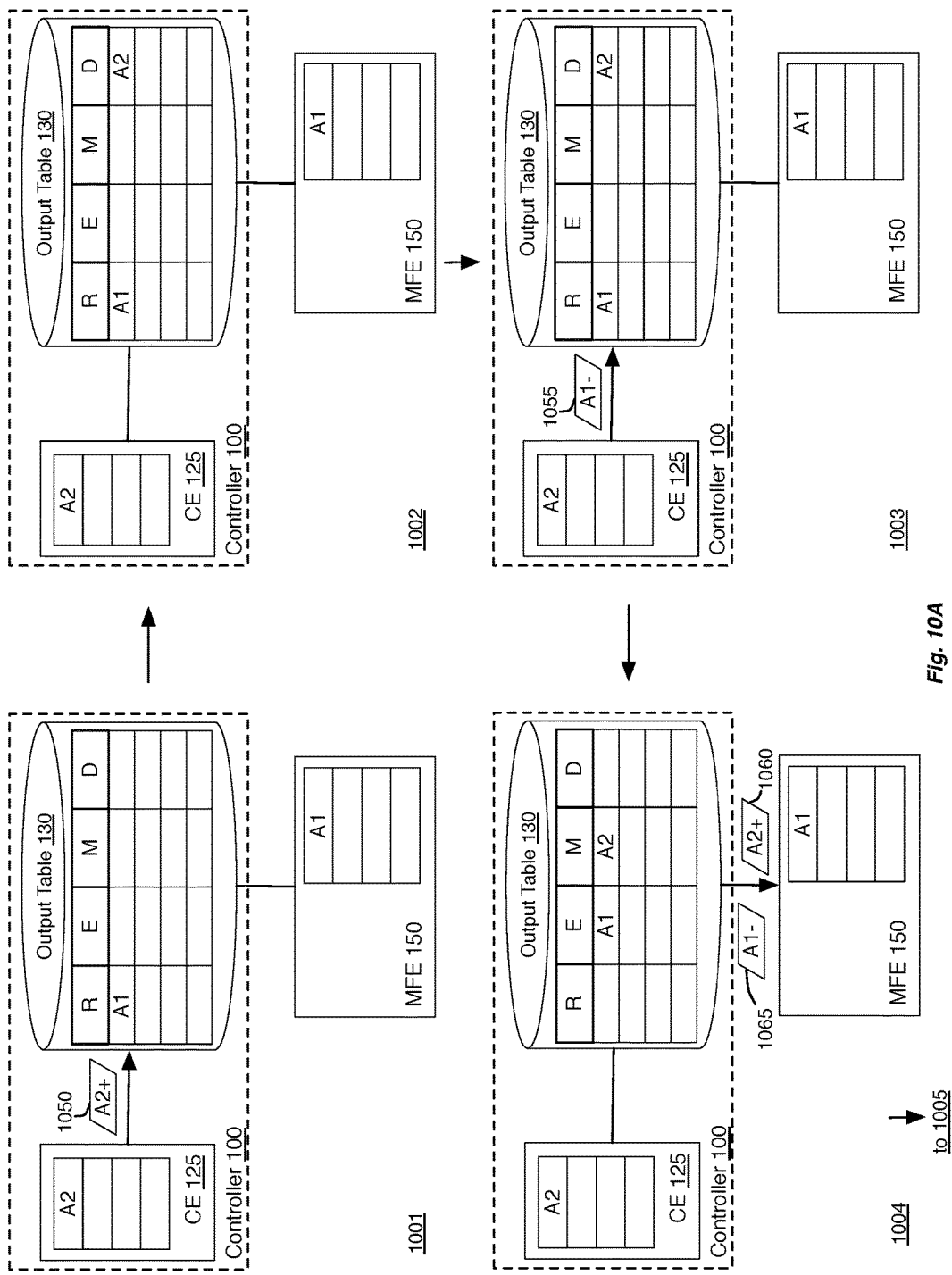
FIGS. 10A-B illustrate an example of handling duplicate network state.
Figure 10B:
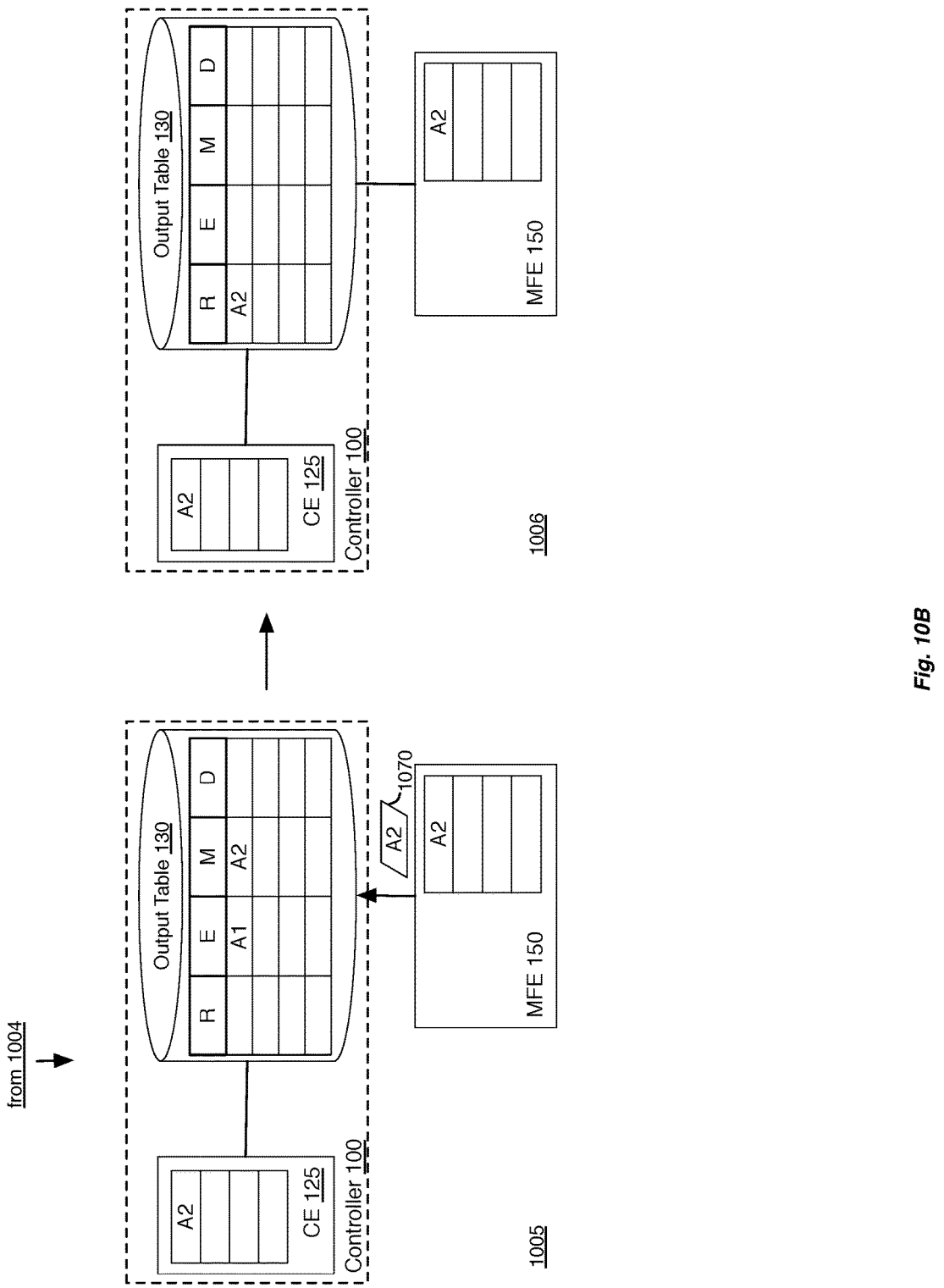

FIGS. 10A-B illustrate an example of handling duplicate network state in six stages 1001-1006. The first stage 1001 shows that the computation has added a new version of a flow A2 to the desired network state at the computation engine 125. The MFE 150 and the reconciled set of the flow output table 1030 store a different version of the flow (A1). In this example, the flow A2 indicates a flow with a same expression (or match condition) as the previous version of the flow A1, but with a different action (e.g., drop, forward, etc.). In the first stage 1001, the computation engine 125 sends the add flow event 1050 to the flow output table 130.

Although the computation engine 125 has sent a new version of the flow, it has not yet sent an instruction to remove the previous flow. The new version of the flow may also be received from another controller. In either case, the flow output table does not automatically replace the previous version of the flow, unless the previous version has been removed. However, rather than ignoring or deleting the new version of the flow, the second stage 1002 shows that the flow output table 130 has added the new version of the flow A2 to the duplicate set. In this case, the reconciled set stores a record that does not match the desired state. However, at this particular point, as the inputs can be received from multiple controllers, the flow output table cannot determine whether the new version or the previous version is the true desired version of the state.

In the third stage 1003, computation engine 125 sends a delete flow event 1055 to remove the previous version of the flow A1 from the flow output table 130. In some embodiments, the computation of flows by the computation engine does not produce flows in a strict order, so it is possible for an add flow event for a new flow to be sent before a delete flow event for the previous flow.

The fourth stage 1004 shows that in response to the delete flow event 1055, the flow output table 130 has moved the previous version of the flow A1 to the extra set and the new version of the flow A2 to the missing set. The fourth stage 1004 also shows that in response to the new records in the extra and missing sets, the flow output table 130 sends delete flow event 1065 to remove flow A1 and add flow event 1060 to add flow A2 to MFE 150.

In the fifth stage 1005, MFE 150 has installed the new version of the flow A2 in the actualized network state and sends back a confirmation 1070 to the flow output table 130 to confirm that the flow was installed successfully. The sixth stage 1006 shows that the flow output table 130 then removes the previous version of the flow A1 from the extra set and moves the new version of the flow A2 from the missing set to the reconciled set to indicate that the flow A2 now matches the desired and reconciled states.

C. Updates from Actualized Network State

Figure 11:
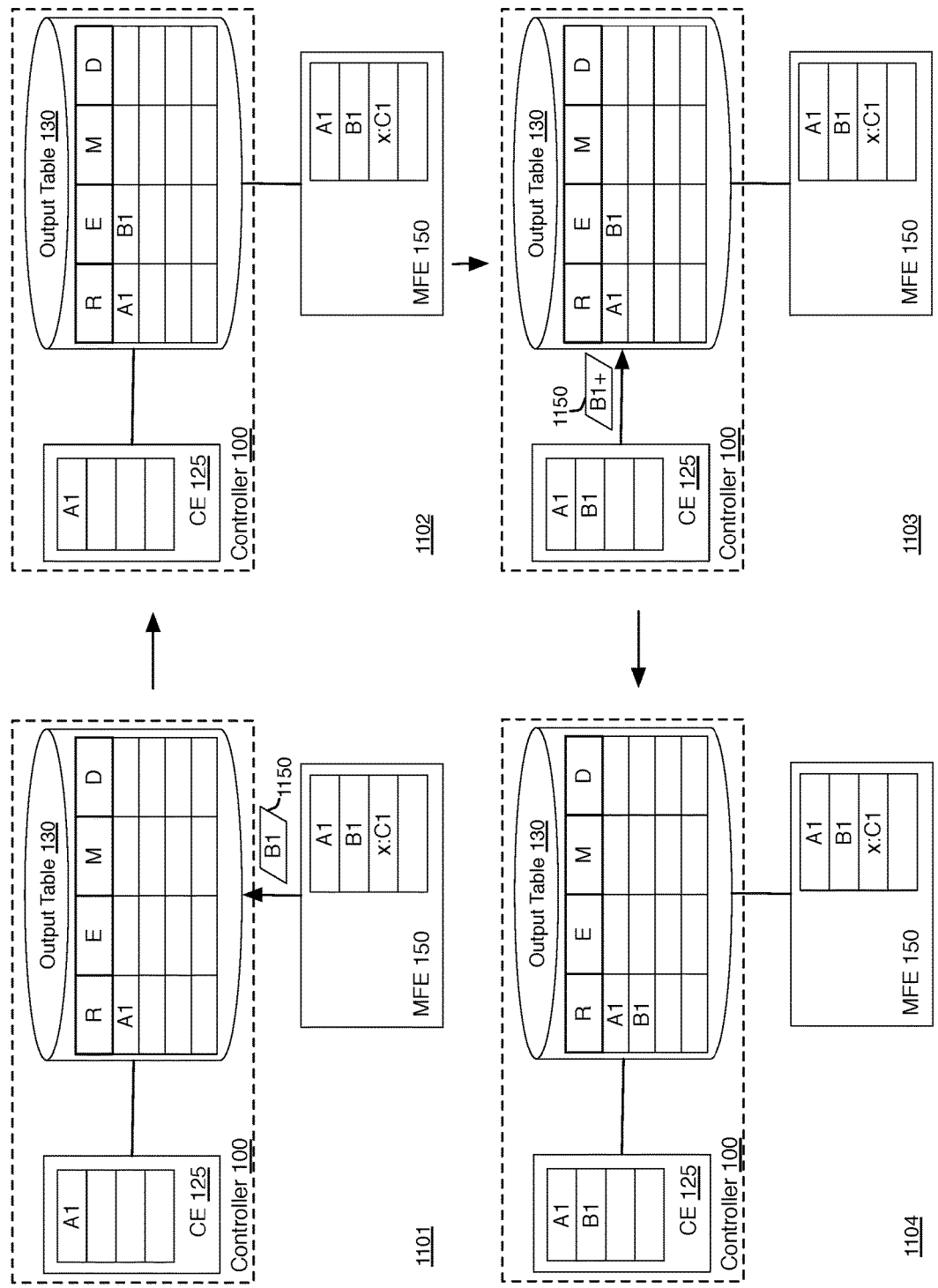
FIG. 11 illustrates an example of handling detected inconsistencies in the network state.

In addition to receiving flow events from the computation engine, the flow output table of some embodiments receives flow events from the managed forwarding elements, which indicate the changes to the actualized state at the MFEs. FIG. 11 illustrates an example of handling detected inconsistencies in the network state in four stages 1101-1104. The first stage 1101 shows that computation engine 125, the reconciled set of flow output table 130, and MFE 150 show the reconciled flow A1. The first stage 1101 also shows that MFE 150 has flows B1 and x:C1.

Flow B1 is a flow that is installed on the MFE, but has no corresponding flow in the desired state generated by the computation engine. Flow x:C1 represents a flow with expression C and action 1. Flow C1 also has no corresponding flow in the desired state, but flow x:C1 has a cookie, "x". The cookie, or marker, can be specified for the different flows and allow the various controllers (and flow output tables) of the network to only handle certain flow events. For example, in some embodiments, the MFEs generate flows based on learning flows. The generated flows are not part of the flows that are generated by the computation engine and would be marked for removal. In order to allow such flows, and other unhandled flows (e.g., flows installed and needed by other controllers). The marker of some embodiments is a prefix associated with each flow.

In the first stage 1101, the flow output table 130 sends an added flow event 1150 to the flow output table 130 for flow B1. In some embodiments, also sends one for flow x:C1. In such embodiments, the flow output table ignores the flow x:C1, based on a reject list or accept list managed by the flow output table that identifies the flows to be handled by the particular controller. In some embodiments, the flow output table 130 only looks for flow events that are the result of callbacks for instructions sent by the controller to the MFEs.

The second stage 1102 shows that a record for the flow B1 added to the MFE is stored in the extra set of the flow output table 130. If left in this state, the FSM will process the record and instruct MFE 150 to delete the flow B1.

In the third stage 1103, the computation engine 125 has added flow B1 to the desired state and sends an add flow event 1150 to add flow B1 to the desired network state. The addition of the flow B1 to the desired state reconciles the flow B1, which the flow output table 130 had initially indicated was an extra flow at MFE 150. In the fourth stage 1104, the flow output table 130 has moved the record for the new flow B1 to the reconciled set.

Figure 12:
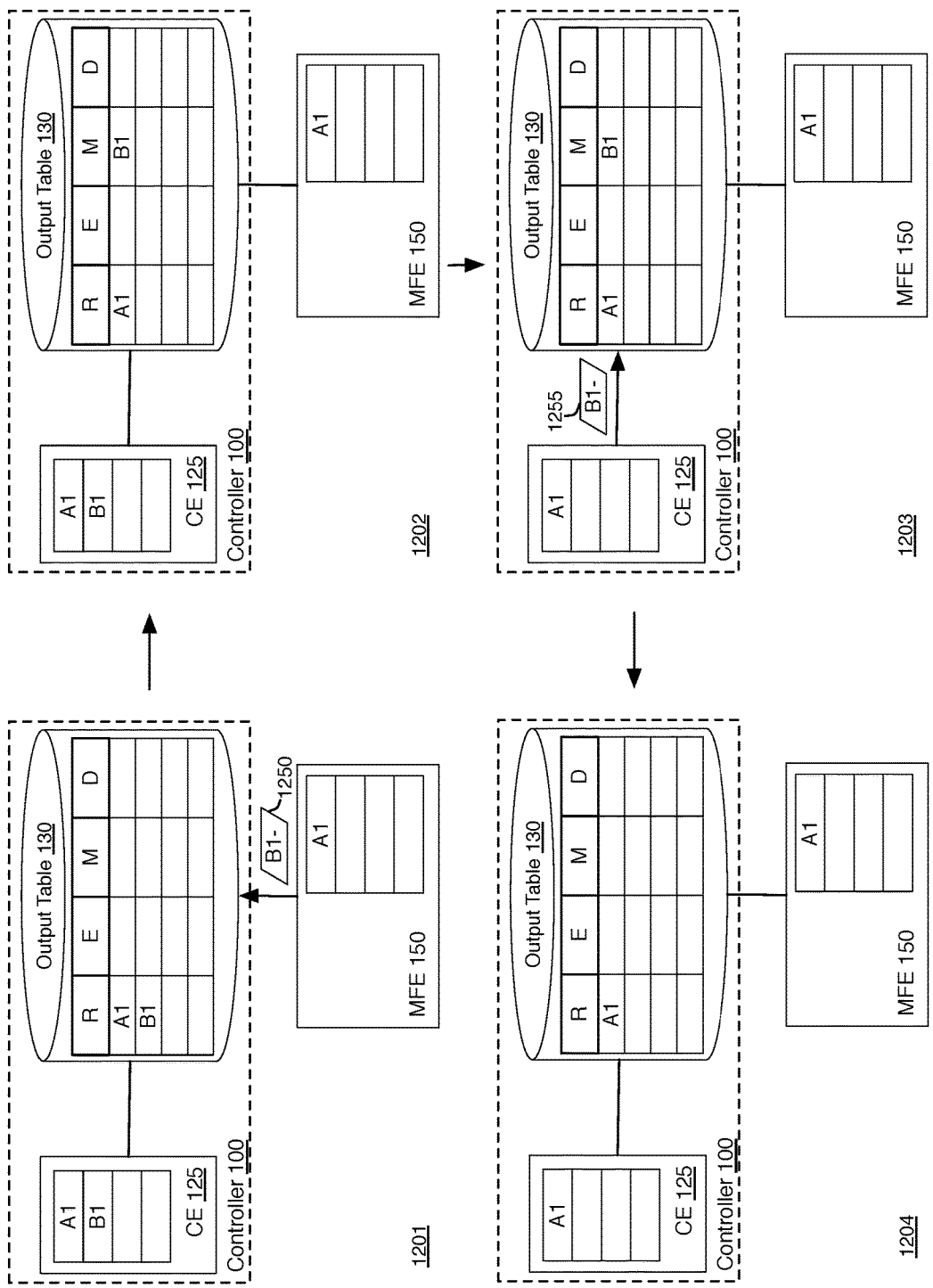
FIG. 12 illustrates an example of detecting and reconciling removed network state.

FIG. 12 illustrates an example of detecting and reconciling removed network state in four stages 1201-1204. Like the example of FIG. 11, the first stage 1201 shows that computation engine 125 and the reconciled set of flow output table 130 show the reconciled flow A1. However, in this example, the flow B1 has been deleted from MFE 150. This may occur when another controller deletes the flow, when the flow is manually deleted from the MFE 150, etc.

In the first stage 1201, the MFE 150 sends a deleted flow event 1250 to the flow output table 130 to indicate that flow B1 has been removed from MFE 150. In the second stage 1202, the flow output table 130 has stored a record for the flow B1 in the missing set of the flow output table 130. If left in this state, the FSM will process the record and instruct MFE 150 to re-add the flow B1.

In the third stage 1203, the computation engine 125 has removed flow B1 from the desired state and sends a delete flow event 1255 to remove flow B1 from the desired network state. The removal of the flow B1 from the desired state reconciles the removed flow B1, which the flow output table 130 had initially indicated was a missing flow at MFE 150. In some embodiments, the output table 130 checks that the flow is not marked as sent before moving flows from the missing set. In the fourth stage 1204, the flow output table 130 has moved the record for the deleted flow B1 to the reconciled set.

Figure 13:
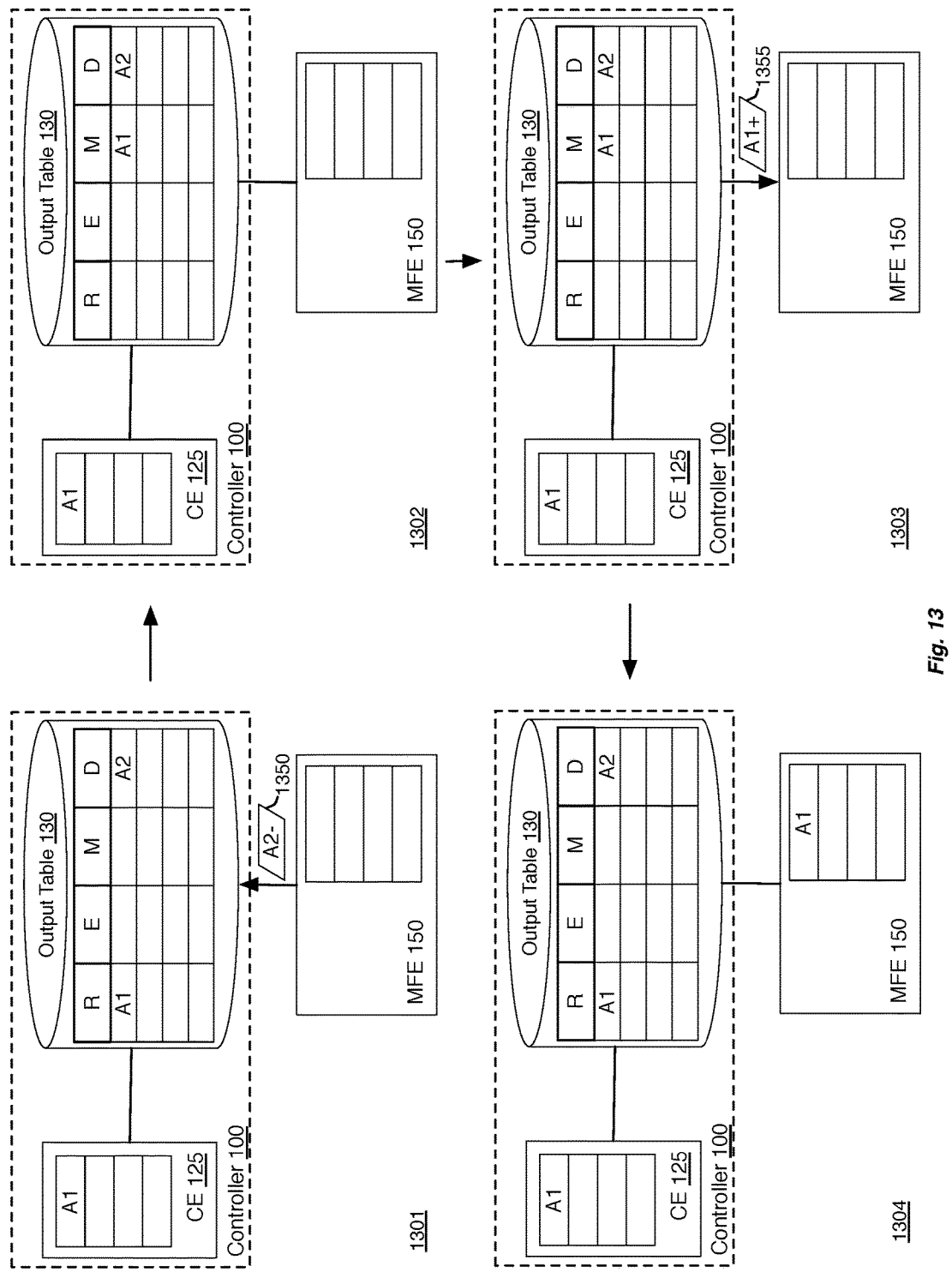
FIG. 13 illustrates another example of detecting and reconciling removed network state.

FIG. 13 illustrates another example of detecting and reconciling removed network state in four stages 1301-1304. The example of this figure is similar to the example described with reference to FIG. 12, where MFE 150 indicates that a flow on the MFE 150 has been removed. Computation engine 125 and flow output table 130 have a flow A1. Flow output table 130 also has a duplicate flow (or a near-match flow) A2 (which matches the expression, but not the action for flow A1) stored in the duplicate set. In this example, MFE 150 sends a deleted flow event 1350 to indicate that the near-match flow A2 has been removed from MFE 150. In this example, a different version of the flow A1 was previously installed on MFE 150, but was subsequently removed.

Upon learning that the MFE 150 has removed a duplicate flow A2, the flow output table 130 determines that the flow A1 is not truly reconciled and needs to be re-installed on the MFE 150. This is the case because only a single version of the flow can be installed on the MFE 150 at any time, so if flow A2 was installed on the MFE 150, flow A1 must have been previously overwritten. Since the flow A1, which was reconciled, is determined to be missing from the MFE 150, the flow A1 needs to be re-installed on the MFE 150. The second stage 1302 shows that in response to receiving the deleted flow event 1350, which specifies a flow that matches a flow in the duplicate set, the output table 130 has moved the flow A1 from the reconciled set to the missing set.

In the third stage 1303, the flow output table 130 sends an instruction 1355 to add flow A1. In some embodiments, the record for flow A1 remains in the missing set until the flow output table 130 receives confirmation that the flow A1 was installed successfully. The fourth stage 1304 shows that the flow A1 was successfully installed at MFE 150 and was confirmed to the flow output table. The fourth stage 1304 also shows that the record for flow A1 has been moved from the missing set to the reconciled set, and that the duplicate flow A2 remains in the duplicate set.

D. Handling MFE Disconnects

Figure 14:
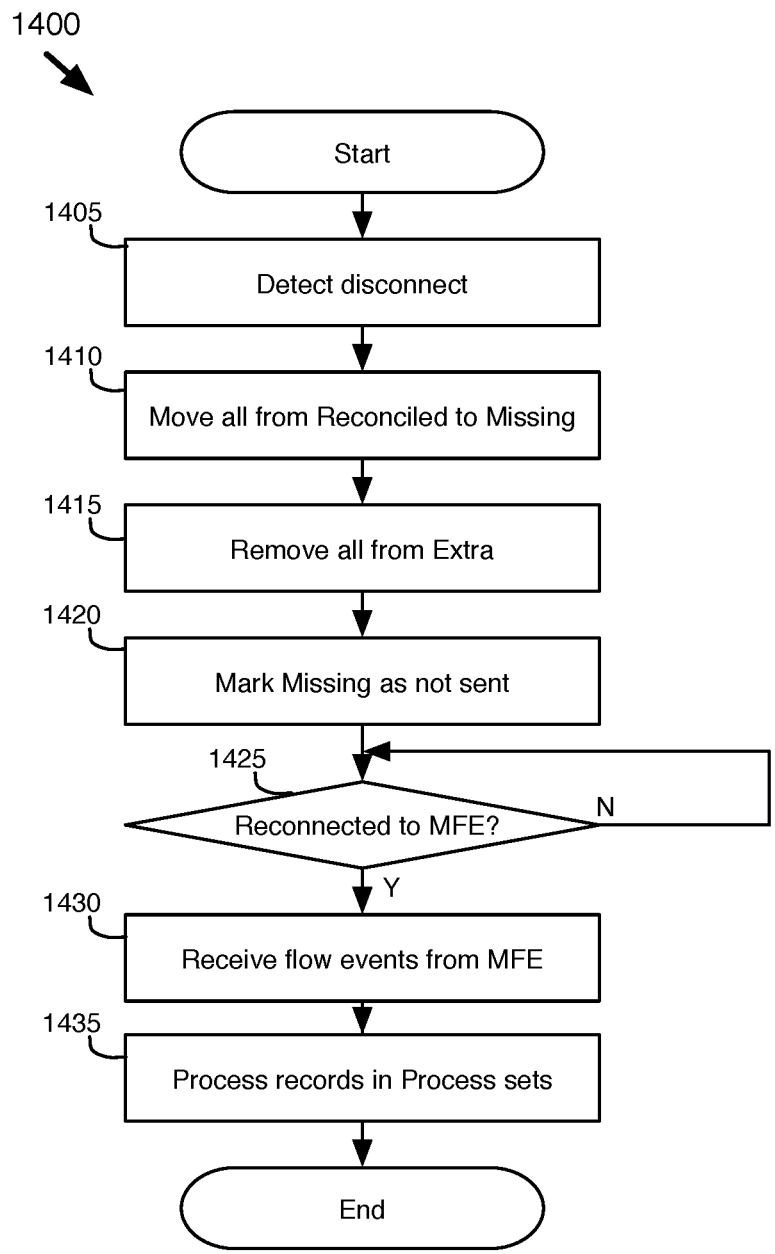
FIG. 14 conceptually illustrates a process for handling a disconnect between a controller and a managed forwarding element.

In some embodiments, when the connection between controller and MFE has been established (e.g., after a disconnect), the MFE will send its current flow state to the controller. This allows the controller to compare the state at the MFE with the desired state in the flow output table, and to send only the necessary flows and delete instructions to reconcile the two states. FIG. 14 conceptually illustrates a process for handling a disconnect between a controller and a managed forwarding element. In some embodiments, the process 1400 is performed by the flow output table, as described in the examples above. The process 1400 detects (at 1405) with one of the MFEs managed by the controller. The process 1400 then moves (at 1410) all of the records for the MFE that are in the reconciled set to the missing set to indicate that it is no longer clear whether the flows are reconciled. The process 1400 then removes (at 1415) any records for flows on the disconnected MFE from the extra set (i.e., flows that were to be removed) and marks (at 1420) all of the records for the disconnected MFE in the missing set as not sent so that flows that were marked as sent, but not confirmed, are re-sent to the MFE.

The process 1400 then waits for the MFE (or a backup MFE) to connect to the controller. The process 1400 determines (at 1425) whether the MFE has connected. When the process 1400 determines that the MFE has not connected, it returns to step 1425 and continues to wait. In some embodiments, the process 1400 maintains the state for a disconnected MFE for a designated amount of time, and deletes the records for any flows for the disconnected MFE after the time expires.

When the process 1400 determines (at 1425) that the MFE has reconnected (or a new MFE with the particular datapath ID) has connected, the process receives (at 1430) flow events for all of the state of the connected MFE. In some embodiments, whenever an MFE initializes a connection with a controller, the MFE sends flow events for all of its existing state to the controller. The process 1400 then processes (at 1435) the received flow events to update the sets of the flow output table. For example, the process 1400 of some embodiments moves matching flows from add flow events from the missing set to the reconciled set, so that the flows do not need to be resent to the MFE. The processing allows the flow output table to determine what flows are still needed at the MFE, as well which flows need to be removed from the MFE.

The process 1400 then processes (at 1440) the records for the flows in the missing and extra sets (i.e., sending and re-sending the flows to to be installed and/or removed on the MFE). The process then ends.

Figure 15:
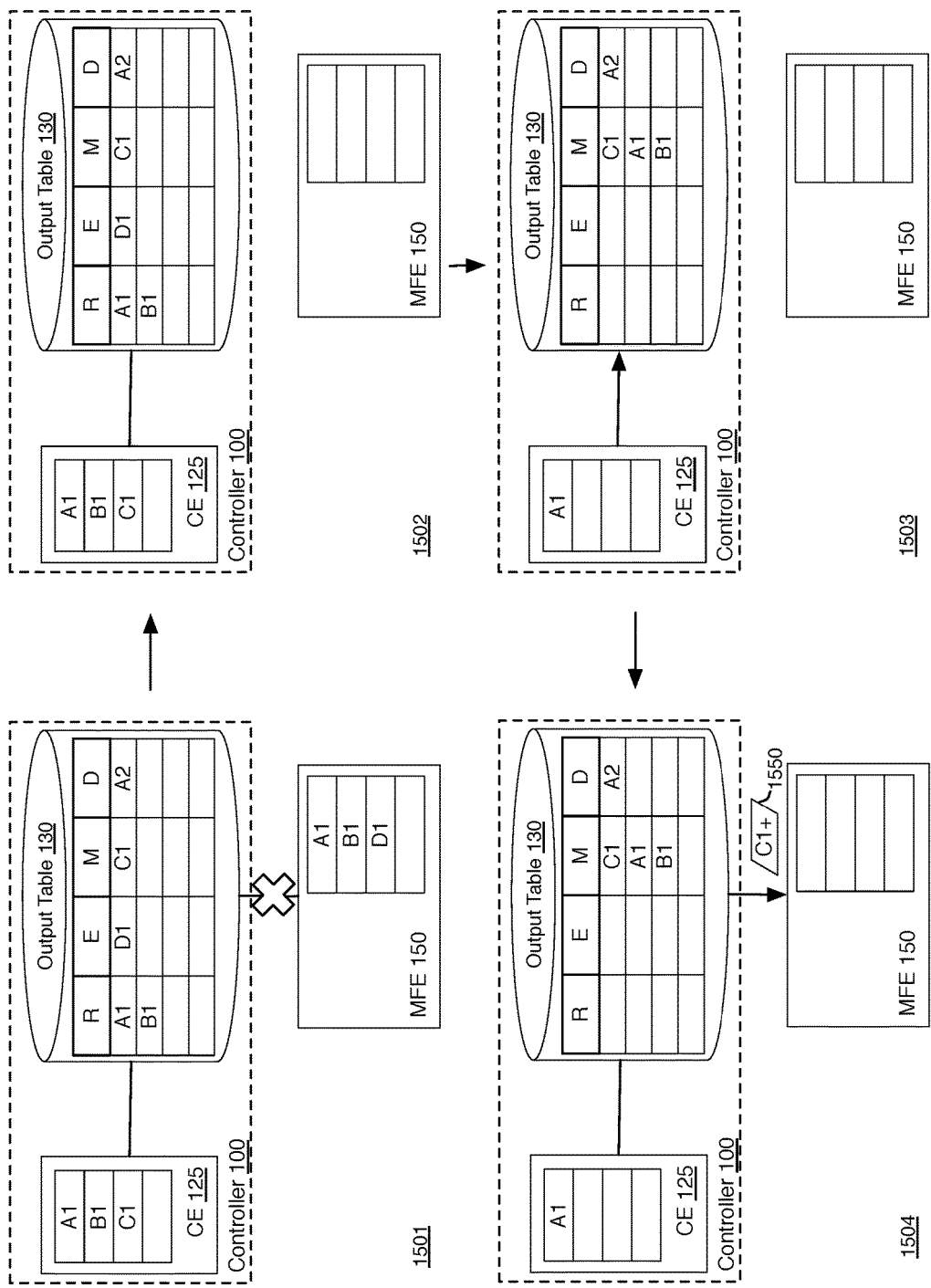
FIG. 15 illustrates an example of handling a disconnect between a controller and a managed forwarding element.

FIG. 15 illustrates an example of handling a disconnect between a controller and a managed forwarding element. The first stage 1501 shows that computation engine 125 has flows A1, B1, and C1 in the desired state. The actualized state at MFE 150 has A1, B1, and an extra flow D1, but is missing flow C1. This is all reflected in flow output table 130, which shows that A1 and B1 are in the reconciled set, C1 is in the missing set, and D1 is in the extra set. In addition, flow output table 130 shows that a near-match flow A2 is stored in the duplicate set.

In the second stage 1502, the MFE 150 has disconnected from the controller 100. When a MFE disconnects from the controller 100, flow output table 130 has to update the records in the different sets to reflect the uncertainty of the state of the disconnected MFE. Flows may be added, removed, or changed while the MFE is disconnected. As the flow output table manages the records for the different flows specific to each MFE, the disconnect of a single MFE does not affect the records and managed state of the other MFEs managed by the particular controller.

The third stage 1503 shows that the flow output table 130 has moved all of the records from the reconciled set to the missing set. In addition, the flow output table 130 has removed all of the entries for the extra set. The flow output table 130 then waits for the controller (or a backup controller) to re-establish the connection.

In the fourth stage 1504, MFE 150 has re-established the connection with the controller 100, and in the fifth stage 1505, flow output table 130 sends instructions to install the remaining flows and to remove the extra flows.

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 16:
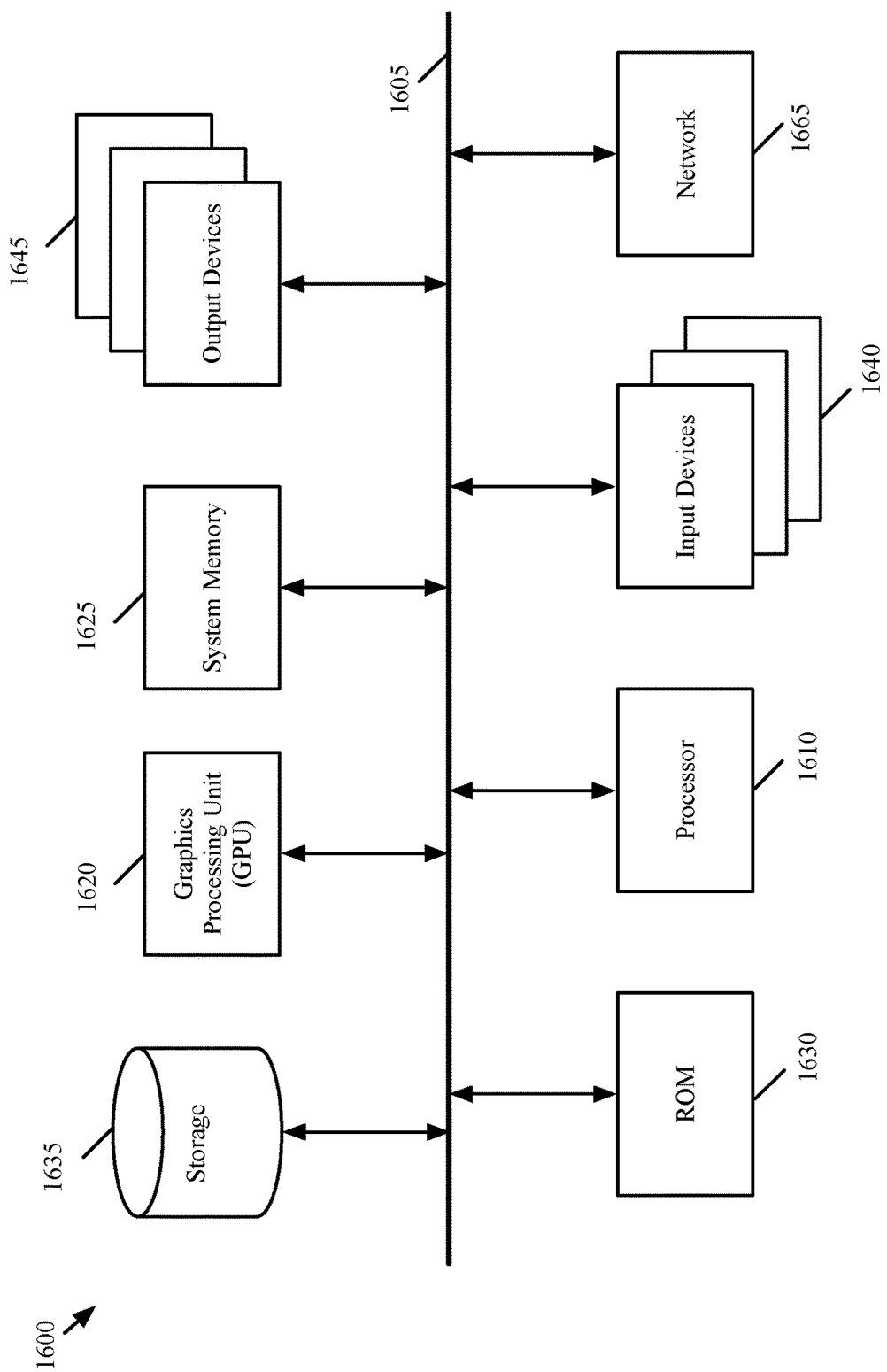
FIG. 16 conceptually illustrates an electronic system with which some embodiments of the invention are implemented.

FIG. 16 conceptually illustrates an electronic system 1600 with which some embodiments of the invention are implemented. The electronic system 1600 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 1600 includes a bus 1605, processing unit(s) 1610, a system memory 1625, a read-only memory 1630, a permanent storage device 1635, input devices 1640, and output devices 1645.

The bus 1605 collectively represents all system, peripheral, and chipset buses that communicatively connect the numerous internal devices of the electronic system 1600. For instance, the bus 1605 communicatively connects the processing unit(s) 1610 with the read-only memory 1630, the system memory 1625, and the permanent storage device 1635.

From these various memory units, the processing unit(s) 1610 retrieves instructions to execute and data to process in order to execute the processes of the invention. The processing unit(s) may be a single processor or a multi-core processor in different embodiments.

The read-only-memory (ROM) 1630 stores static data and instructions that are needed by the processing unit(s) 1610 and other modules of the electronic system. The permanent storage device 1635, on the other hand, is a read-and-write memory device. This device is a non-volatile memory unit that stores instructions and data even when the electronic system 1600 is off. Some embodiments of the invention use a mass-storage device (such as a magnetic or optical disk and its corresponding disk drive) as the permanent storage device 1635.

Other embodiments use a removable storage device (such as a floppy disk, flash memory device, etc., and its corresponding drive) as the permanent storage device. Like the permanent storage device 1635, the system memory 1625 is a read-and-write memory device. However, unlike storage device 1635, the system memory 1625 is a volatile read-and-write memory, such a random access memory. The system memory 1625 stores some of the instructions and data that the processor needs at runtime. In some embodiments, the invention's processes are stored in the system memory 1625, the permanent storage device 1635, and/or the read-only memory 1630. From these various memory units, the processing unit(s) 1610 retrieves instructions to execute and data to process in order to execute the processes of some embodiments.

The bus 1605 also connects to the input and output devices 1640 and 1645. The input devices 1640 enable the user to communicate information and select commands to the electronic system. The input devices 1640 include alphanumeric keyboards and pointing devices (also called "cursor control devices"), cameras (e.g., webcams), microphones or similar devices for receiving voice commands, etc. The output devices 1645 display images generated by the electronic system or otherwise output data. The output devices 1645 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 16, bus 1605 also couples electronic system 1600 to a network 1665 through a network adapter (not shown). In this manner, the computer can be a part of a network of computers (such as a local area network ("LAN"), a wide area network ("WAN"), or an Intranet, or a network of networks, such as the Internet. Any or all components of electronic system 1600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

The term "packet" is used throughout this application to refer to a collection of bits in a particular format sent across a network. It should be understood that the term "packet" may be used herein to refer to various formatted collections of bits that may be sent across a network. A few examples of such formatted collections of bits are Ethernet frames, TCP segments, UDP datagrams, IP packets, etc.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. For a network controller that manages a flow-based managed forwarding element (MFE), a method comprising:
    maintaining a flow entry output table comprising:
        a first set of records for flow entries generated by the network controller for the MFE and determined to have a matching flow entry installed on the MFE;
        a second set of records for flow entries generated by the network controller for the MFE but without a matching flow entry yet installed on the MFE; and
        a third set of records for flow entries generated by the network controller and determined to have (i) a same matching expression as another flow entry in one of the first and second sets of records and (ii) a different action than the flow entry with the same matching expression; and
    when a record for a first flow entry with a particular match condition is removed from one of the first and second sets of records and a record for a second flow entry with the particular match condition is in the third set of records, moving the record for the second flow entry from the third set of records to the second set of records for the second flow entry to be installed on the MFE.

2. The method of claim 1, wherein the record for the first flow entry with the particular match condition is removed from the first set of records by moving the first flow entry to a fourth set of records of the flow entry output table.

3. The method of claim 2, wherein the fourth set of records is for flow entries installed on the MFE but which the network controller has either (i) not generated for the MFE or (ii) indicated as flow entries to be removed from the MFE.

4. The method of claim 3 further comprising using the flow entry output table to direct the MFE to install the second flow entry and remove the first flow entry.

5. The method of claim 1, wherein the flow entries generated by the network controller describe a desired network state and the flow entries installed on the MFE describe an actualized network state, wherein the method further comprises using the flow entry output table to match the actualized network state to the desired network state.

6. The method of claim 1, wherein each flow entry comprises (i) a matching expression for matching against packets to be handled by the flow entry and (ii) an action that describes an action for the MFE to perform on packets that match the matching expression of the flow entry.

7. The method of claim 1 further comprising, prior to moving the record for the second flow entry, receiving a flow event from a central network controller that specifies to remove the second flow entry from the MFE.

8. The method of claim 7, wherein the flow event is a first flow event, the method further comprising, prior to receiving the first flow event, receiving a second flow event from the central network controller that specifies to add the first flow entry to the MFE.

9. The method of claim 1, wherein the network controller is a local network controller that executes on a same host computer as the MFE.

10. The method of claim 9, wherein the network controller provides data to a plurality of local network controllers, wherein each respective local network controller executes on a same respective host computer as a respective MFE that the respective local network controller manages.

11. A non-transitory machine readable medium storing a network controller program which when executed by at least one processing unit manages a flow-based managed forwarding element (MFE), the network controller program comprising sets of instructions for:
maintaining a flow entry output table comprising:
a first set of records for flow entries generated by the network controller for the MFE and determined to have a matching flow entry installed on the MFE;
a second set of records for flow entries generated by the network controller for the MFE but without a matching flow entry yet installed on the MFE; and
a third set of records for flow entries generated by the network controller and determined to have (i) a same matching expression as another flow entry in one of the first and second sets of records and (ii) a different action than the flow entry with the same matching expression; and
when a record for a first flow entry with a particular match condition is removed from one of the first and second sets of records and a record for a second flow entry with the particular match condition is in the third set of records, moving the record for the second flow entry from the third set of records to the second set of records for the second flow entry to be installed on the MFE.

12. The non-transitory machine readable medium of claim 11, wherein the record for the first flow entry with the particular match condition is removed from the first set of records by moving the first flow entry to a fourth set of records of the flow entry output table.

13. The non-transitory machine readable medium of claim 12, wherein the fourth set of records is for flow entries installed on the MFE but which the network controller has either (i) not generated for the MFE or (ii) indicated as flow entries to be removed from the MFE.

14. The non-transitory machine readable medium of claim 13, wherein the network controller program further comprises a set of instructions for using the flow entry output table to direct the MFE to install the second flow entry and remove the first flow entry.

15. The non-transitory machine readable medium of claim 11, wherein the flow entries generated by the network controller describe a desired network state and the flow entries installed on the MFE describe an actualized network state, wherein the network controller program further comprises a set of instructions for using the flow entry output table to match the actualized network state to the desired network state.

16. The non-transitory machine readable medium of claim 11, wherein each flow entry comprises (i) a matching expression for matching against packets to be handled by the flow entry and (ii) an action that describes an action for the MFE to perform on packets that match the matching expression of the flow entry.

17. The non-transitory machine readable medium of claim 11, wherein the network controller program further comprises a set of instructions for, prior to moving the record for the second flow entry, receiving a flow event from a central network controller that specifies to remove the second flow entry from the MFE.

18. The non-transitory machine readable medium of claim 17, wherein the flow event is a first flow event, the network controller program further comprising a set of instructions for, prior to receiving the first flow event, receiving a second flow event from the central network controller that specifies to add the first flow entry to the MFE.

19. The non-transitory machine readable medium of claim 11, wherein the network controller is a local network controller that executes on a same host computer as the MFE.

20. The non-transitory machine readable medium of claim 19, wherein the network controller provides data to a plurality of local network controllers, wherein each respective local network controller executes on a same respective host computer as a respective MFE that the respective local network controller manages.

* * * * *